US010411522B2

(12) United States Patent
Ichikawa

(10) Patent No.: US 10,411,522 B2
(45) Date of Patent: Sep. 10, 2019

(54) CONTACTLESS POWER TRANSMITTING DEVICE, CONTACTLESS POWER RECEIVING DEVICE, AND CONTACTLESS ELECTRIC POWER TRANSFER SYSTEM

(75) Inventor: Shinji Ichikawa, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 661 days.

(21) Appl. No.: 14/379,641

(22) PCT Filed: Feb. 22, 2012

(86) PCT No.: PCT/JP2012/054221
§ 371 (c)(1), (2), (4) Date: Aug. 19, 2014

(87) PCT Pub. No.: WO2013/124977
PCT Pub. Date: Aug. 29, 2013

(65) Prior Publication Data
US 2015/0015084 A1 Jan. 15, 2015

(51) Int. Cl.
*H04B 5/00* (2006.01)
*B60L 53/31* (2019.01)
(Continued)

(52) U.S. Cl.
CPC .............. *H02J 50/80* (2016.02); *B60L 53/12* (2019.02); *B60L 53/305* (2019.02); *B60L 53/31* (2019.02); *B60L 53/36* (2019.02); *B60L 53/38* (2019.02); *B60L 53/65* (2019.02); *B60L 53/665* (2019.02); *H02J 7/025* (2013.01); *H02J 50/12* (2016.02); *H02J 50/40* (2016.02); *H04B 5/0031* (2013.01); *B60L 2250/16* (2013.01); *Y02T 10/7005* (2013.01); *Y02T 10/7088* (2013.01);
(Continued)

(58) Field of Classification Search
CPC .... H02J 17/00; H02J 5/00; H02J 5/005; H02J 7/00; H02J 7/02; G01R 27/28; G01R 23/00; G08B 21/00
USPC .............. 307/104, 149, 9.1, 10.1, 10.2, 108; 345/204, 205, 206, 210; 290/43, 42, 44, 290/46
See application file for complete search history.

(56) References Cited

U.S. PATENT DOCUMENTS

2003/0117142 A1* 6/2003 Amini ...................... G01V 3/28 324/339
2004/0195840 A1* 10/2004 Baarman ................ C02F 1/325 290/43
(Continued)

FOREIGN PATENT DOCUMENTS

CN 102122848 A 7/2011
JP 2000-269059 A 9/2000
(Continued)

*Primary Examiner* — Fritz M Fleming
*Assistant Examiner* — Jagdeep S Dhillon
(74) *Attorney, Agent, or Firm* — Sighrue Mion, PLLC

(57) ABSTRACT

A contactless power transmitting device is capable of contactlessly transmitting power to a power receiving device. The contactless power transmitting device includes a power transmitting unit configured to be capable of contactlessly transmitting power to the power receiving device, and a communication unit configured to send information, which relates to a magnetic flux distribution of the power transmitting unit during power transmission, to the power receiving device.

16 Claims, 23 Drawing Sheets

(51) Int. Cl.

| | |
|---|---|
| ***B60L 53/36*** | (2019.01) |
| ***H02J 50/40*** | (2016.01) |
| ***H02J 50/80*** | (2016.01) |
| ***H01F 27/42*** | (2006.01) |
| ***H01F 37/00*** | (2006.01) |
| ***H01F 38/00*** | (2006.01) |
| ***H02J 7/02*** | (2016.01) |
| ***B60L 53/12*** | (2019.01) |
| ***B60L 53/30*** | (2019.01) |
| ***B60L 53/38*** | (2019.01) |
| ***B60L 53/65*** | (2019.01) |
| ***B60L 53/66*** | (2019.01) |
| ***H02J 50/12*** | (2016.01) |

(52) U.S. Cl.

CPC ............ *Y02T 90/121* (2013.01); *Y02T 90/122* (2013.01); *Y02T 90/125* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2009/0325651 | A1 | 12/2009 | Kondo et al. | |
| 2010/0007307 | A1* | 1/2010 | Baarman ................. | H02J 5/005 320/108 |
| 2010/0259110 | A1 | 10/2010 | Kurs et al. | |
| 2010/0259217 | A1* | 10/2010 | Baarman ................. | H02J 5/005 320/108 |
| 2010/0315389 | A1* | 12/2010 | Sorrell ..................... | H01Q 1/22 345/204 |
| 2011/0169337 | A1* | 7/2011 | Kozakai .................. | H02J 5/005 307/104 |
| 2011/0181238 | A1* | 7/2011 | Soar ......................... | B60N 2/24 320/108 |
| 2011/0204711 | A1* | 8/2011 | Norconk ................. | H02J 5/005 307/3 |
| 2011/0241616 | A1 | 10/2011 | Kim et al. | |
| 2012/0235500 | A1* | 9/2012 | Ganem .................... | H03H 7/40 307/104 |
| 2012/0235636 | A1* | 9/2012 | Partovi ................... | H02J 7/025 320/108 |
| 2012/0242160 | A1* | 9/2012 | Tseng ................... | H04B 5/0037 307/104 |
| 2018/0131242 | A1* | 5/2018 | Louis ...................... | H02J 50/80 |

FOREIGN PATENT DOCUMENTS

| | | | |
|---|---|---|---|
| JP | 2010-158151 | A | 7/2010 |
| JP | 2010-172084 | A | 8/2010 |
| JP | 2011-166877 | A | 8/2011 |
| JP | 2011-217452 | A | 10/2011 |
| JP | 2011217460 | A | 10/2011 |
| JP | 2011217461 | A | 10/2011 |
| WO | 2011/016736 | A2 | 2/2011 |
| WO | 2013/069089 | A1 | 5/2013 |

* cited by examiner

CONTACTLESS POWER TRANSMITTING DEVICE, CONTACTLESS POWER RECEIVING DEVICE, AND CONTACTLESS ELECTRIC POWER TRANSFER SYSTEM

TECHNICAL FIELD

The invention relates to a contactless power transmitting device, a contactless power receiving device, and a contactless power transfer system.

BACKGROUND ART

A technique for contactless transmission or reception of electric power to or from a device has recently attracted attention because it requires less effort on connection, or the like. Contactless charging has also found practical use for charging portable devices and electric automobiles.

Japanese Patent Application Publication No. 2010-172084 (Patent Document 1) discloses a coil unit for a contactless power feed device in which a coil is wound on a plurality of divided flat magnetic cores.

Patent Document 1: Japanese Patent Application Publication No. 2010-172084

Patent Document 2: International Patent Application No. 2011/016736

Patent Document 3: US Patent Application Publication No. 2010/259110

Patent Document 4: Japanese Patent Application Publication No. 2000-269059

SUMMARY OF THE INVENTION

In addition to the coil unit disclosed in JP 2010-172084 A, coil units of a plurality of types have been investigated for applications to contactless power feed.

In contactless power feed, the magnetic flux distribution generated in a coil unit or the magnetic flux distribution advantageous for power reception by the coil unit differs depending on the coil shape, winding method, and shape of the magnetic core. Where the magnetic flux densities of the power transmitting unit and power receiving unit, which constitute a pair, differ from each other, electric power cannot be efficiently transferred.

Further, it is generally difficult for a user to identify match and mismatch of magnetic flux density, and compatibility of the power transmitting unit and power receiving unit cannot be identified unless the charging operating is actually performed, which is inconvenient.

Another inconvenience is that electric power cannot be transmitted and received just because the magnetic flux densities of the power transmitting unit and power receiving unit mismatch.

It is an objective of the invention to provide a contactless power transmitting device, a contactless power receiving device, and a contactless power transfer system in which compatibility of a power transmitting unit and a power receiving unit can be identified without actually transferring electric power between the power transmitting unit and power receiving unit and without checking whether a compatible coil unit is present in the vicinity of the power transmitting unit.

It is another objective of the invention to provide a contactless power transmitting device, a contactless power receiving device, and a contactless power transfer system that can be adapted for a plurality of systems.

Summarizing, the invention provides a contactless power transmitting device capable of contactlessly transmitting power to a power receiving device, the contactless power transmitting device including a power transmitting unit configured to be capable of contactlessly transmitting power to the power receiving device, and a communication unit that sends information, which relates to a magnetic flux distribution of the power transmitting unit during power transmission, to the power receiving device.

It is preferred that the information be used to determine whether or not the power receiving device is to receive electric power from the contactless power transmitting device.

It is more preferred that the communication unit transmit the information before the power transmitting unit starts transmitting power to the power receiving device.

It is preferred that the information include information relating to a structure of a part constituting the power transmitting unit or a parameter of the power transmitting unit that affects a magnetic flux distribution occurring in the power transmitting unit during power transmission.

Another aspect of the invention resides in a contactless power transmitting device capable of contactlessly transmitting power to a power receiving device, the contactless power transmitting device including a power transmitting unit configured to be capable of contactlessly transmitting power to the power receiving device, and an adjustment device capable of adjusting a magnetic flux distribution of the power transmitting unit during power transmission.

It is preferred that the power transmitting device further include a control unit that controls the adjustment device on the basis of information relating to the power receiving device, such that the magnetic flux distribution of the power transmitting unit during power transmission becomes compatible with the power receiving device.

Yet another aspect of the invention resides in a contactless power receiving device capable of contactlessly receiving power from a power transmitting device, the contactless power receiving device including a power receiving unit configured to be capable of contactlessly receiving power from the power transmitting device, and a communication unit that sends information, which relates to a magnetic flux distribution of the power receiving unit during power reception, to the power transmitting device.

It is preferred that the information be used to determine whether or not the power transmitting device is to transmit power to the contactless power receiving device.

It is more preferred that the communication unit transmit the information before the power receiving unit starts receiving power from the power transmitting device.

It is preferred that the information include information relating to a structure of a part constituting the power receiving unit or a parameter of the power receiving unit that affects a magnetic flux distribution that is to occur in the power receiving unit during power reception.

Still another aspect of the invention resides in a, contactless power receiving device capable of contactlessly receiving power from a power transmitting device, the contactless power receiving device including a power receiving unit configured to be capable of contactlessly receiving power from the power transmitting device, and an adjustment device capable of adjusting a magnetic flux distribution suitable for the power receiving unit during power reception.

It is preferred that the power receiving device further include a control unit that controls the adjustment device on the basis of information relating to the power transmitting device, such that the magnetic flux distribution suitable for the power receiving unit during power reception becomes compatible with the power transmitting device.

Still another aspect of the invention resides in a contactless power transfer system including a power receiving device and a power transmitting device capable of contactlessly transmitting power to the power receiving device. The power transmitting device includes a power transmitting unit configured to be capable of contactlessly transmitting power to the power receiving device, and a communication unit that sends information, which relates to a magnetic flux distribution of the power transmitting unit during power transmission, to the power receiving device.

A contactless power transfer system according to yet another aspect of the invention includes a power transmitting device and a power receiving device capable of contactlessly receiving power from the power transmitting device. The power receiving device includes a power receiving unit configured to be capable of contactlessly receiving power from the power transmitting device, and a communication unit that sends information, which relates to a magnetic flux distribution of the power receiving unit during power reception, to the power transmitting device.

In accordance with the invention, compatibility of a power transmitting unit and a power receiving unit can be identified without actually transferring power between the power transmitting unit and power receiving unit and without checking whether a compatible coil unit is present in the vicinity of the power transmitting unit.

Another effect of the invention is that the possibility of transferring power is increased by using the configuration that can be adapted for a plurality of systems.

MODES FOR CARRYING OUT THE INVENTION

Figure 1:
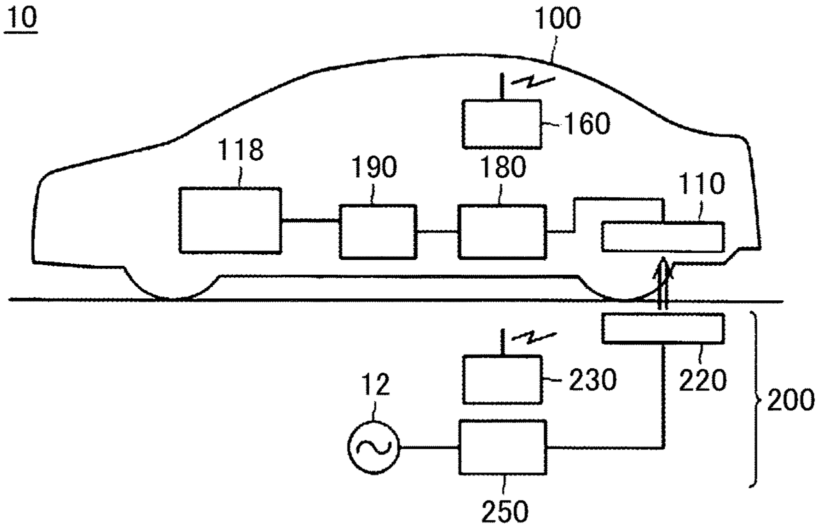
FIG. 1 is an overall block diagram illustrating an example of a contactless power transfer system.

The embodiments of the invention will be explained below in greater detail with reference to the appended drawings. In the figures, like or similar components are assigned with like reference numerals and the explanation thereof is not repeated.

[Overall Configuration of Contactless Electric Power Transfer System]

FIG. 1 is an overall block diagram that shows an example of the contactless power transfer system. A vehicle 100 is, for example, an electric automobile using a rotating electrical machine as a drive source, but it may be any automobile, provided that electric power is contactlessly received. Further, a power receiving object may not be a vehicle.

Referring to FIG. 1, the contactless power transfer system includes a power transmitting device 200 and the vehicle 100. The power transmitting device 200 includes a power supply unit 250, a power transmitting unit 220, and a communication unit 230. The vehicle 100 includes a power receiving unit 110, a rectifier 180, an electrical storage device 190, and a power generating device 118.

The power supply unit 250 receives electric power from a power supply 12 and generates high-frequency alternate current (AC) power. The power supply 12 may be a commercial power supply or an independent power supply device. The power transmitting unit 220 receives the supply of the high-frequency AC power from the power supply unit 250 and contactlessly transmits the power to the power receiving unit 110. For example, the power transmitting unit 220 is configured of a resonance circuit including a coil and a capacitor.

Meanwhile, in the vehicle 100, the power receiving unit 110 contactlessly receives the power transmitted from the power transmitting unit 220 on the power transmitting device 200 side, and outputs the received power to the rectifier 180. For example, the power receiving unit 110 is also configured of a resonance circuit including a coil and a capacitor.

The rectifier 180 converts the AC power, which is received from the power receiving unit 110, into direct current (DC) power and outputs the converted DC power to the electrical storage device 190, thereby charging the electrical storage device 190. The electrical storage device 190 stores the power outputted from the rectifier 180 and also stores the electric power generated by the power generating device 118. The electrical storage device 190 supplies the stored electric power to the power generating device 118. A large-capacitance capacitor can be used as the electrical storage device 190.

The power generating device 118 uses the electric power stored in the electrical storage device 190 to generate drive power for running the vehicle 100. Although not specifically shown in FIG. 1, the power generating device 118, for example, includes an inverter that receives electric power from the electrical storage device 190, a motor that is driven by the inverter, and drive wheels that are driven by the motor. The power generating device 118 may also include a generator for charging the electrical storage device 190, and an engine capable of driving the generator.

In the contactless power transfer system, the natural frequency of the power transmitting unit 220 of the power transmitting device 200 is the same as the natural frequency of the power receiving unit 110 of the vehicle 100. Here, the natural frequency of the power transmitting unit 220 (power receiving unit 110) means an oscillation frequency in the case of free oscillations of the electric circuit (resonance circuit) constituting the power transmitting unit 220 (power receiving unit 110). In the electric circuit (resonance circuit) constituting the power transmitting unit 220 (power receiving unit 110), the natural frequency at the time when a braking force or electrical resistance is zero is also called the resonance frequency of the power transmitting unit 220 (power receiving unit 110).

"The same" natural frequency, as referred to hereinabove, not only means exact equality but also includes the case in which the natural frequency is substantially the same. The "substantially the same" natural frequency means, for example, that the difference between the natural frequency of the power transmitting unit 220 and the natural frequency of the power receiving unit 110 is within 10% of the natural frequency of the power transmitting unit 220 or the power receiving unit 110.

The power transmitting unit 220 contactlessly transmits electric power to the power receiving unit 110 of the vehicle 100 via at least either of a magnetic field that is formed between the power transmitting unit 220 and the power receiving unit 110 and oscillates at a specific frequency and an electric field that is formed between the power transmitting unit 220 and the power receiving unit 110 and oscillates at a specific frequency. The coupling coefficient κ between the power transmitting unit 220 and the power receiving unit 110 is preferably equal to or less than 0.1, and the power transmitting unit 220 and the power receiving unit 110 are designed such that the product of the coupling coefficient κ and a Q value representing a resonance strength is equal to or higher than a predetermined value (for example, 1.0).

Where the power transmitting unit 220 and the power receiving unit 110 are thus caused by the electromagnetic field to resonate, electric power is contactlessly transferred from the power transmitting unit 220 of the power transmitting device 200 to the power receiving unit 110 of the vehicle 100.

As mentioned hereinabove, in the contactless power transfer system, electric power is contactlessly transferred from the power transmitting unit 220 to the power receiving unit 110 by causing the power transmitting unit 220 and the power receiving unit 110 to resonate by the electromagnetic field. Coupling between the power transmitting unit 220 and the power receiving unit 110 in such power transfer is called, for example, "magnetic resonance coupling", "magnetic field resonance coupling", "electromagnetic field resonance coupling", or "electric field resonance coupling". The "electromagnetic field resonance coupling" means coupling that includes all of the "magnetic resonance coupling", "magnetic field resonance coupling", and "electric field resonance coupling".

Where the power transmitting unit 220 and the power receiving unit 110 are formed by coils, as mentioned hereinabove, the power transmitting unit 220 and the power receiving unit 110 are coupled mainly through a magnetic field, and "magnetic resonance coupling" or "magnetic field resonance coupling" is formed. An antenna, for example, such as a meander line antenna, can be also used for the power transmitting unit 220 and the power receiving unit 110. In this case, the power transmitting unit 220 and the power receiving unit 110 are coupled mainly through an electric field, and "electric field resonance coupling" is formed.

Figure 2:
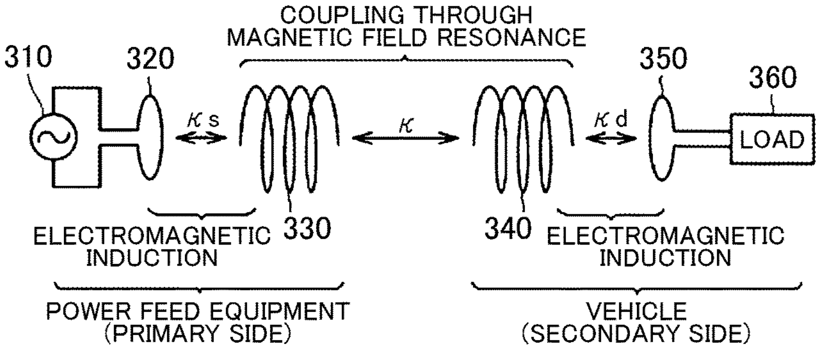
FIG. 2 is a schematic diagram for explaining the principle of electric power transmission based on a resonance method.

FIG. 2 is a schematic diagram illustrating the principle of power transmission through a resonance method.

Referring to FIG. 2, in the resonance method, two inductor-capacitor (LC) resonant coils having the same natural frequency resonate in an electromagnetic field (near field), in the same manner as two tuning forks resonate, whereby electric power is transferred from one coil to the other coil through the electromagnetic field.

More specifically, a primary coil 320 is connected to a high-frequency power supply 310, and high-frequency electric power is supplied through electromagnetic induction to a primary self-resonant coil 330 that is magnetically coupled to the primary coil 320. The primary self-resonant coil 330 is an LC resonator which is formed by the inductance and stray capacitance of the coil itself, and resonates via an electromagnetic field (near field) with a secondary self-resonant coil 340 having the same resonant frequency as the primary self-resonant coil 330. As a result, energy (electric power) is transferred from the primary self-resonant coil 330 to the secondary self-resonant coil 340 through the electromagnetic field. The energy (electric power) transferred to the secondary self-resonant coil 340 is taken out by a secondary coil 350 that is magnetically coupled to the secondary self-resonant coil 340 through electromagnetic induction, and is supplied to a load 360. The transmission of power by the resonance method is realized when the Q value representing the resonance strength between the primary self-resonant coil 330 and the secondary self-resonant coil 340 is larger than, for example, 100.

In the power transfer system according to the embodiment, electric power is transmitted from the power transmitting unit to the power receiving unit by causing the power transmitting unit and the power receiving unit to resonate by the electromagnetic field, and the coupling coefficient (κ) between the power transmitting unit and the power receiving unit is preferably equal to or less than 0.1. The coupling coefficient (κ) is not limited to this value and can take various values at which power transfer is effective. In power transfer using electromagnetic induction, the coupling coefficient (κ) between the power transmitting unit and the power receiving unit is typically close to 1.0.

Concerning the correspondence relationship with FIG. 1, the secondary self-resonant coil 340 and the secondary coil 350 correspond to the power receiving unit 110 in FIG. 1, and the primary coil 320 and the primary self-resonant coil 330 correspond to the power transmitting unit 220 shown in FIG. 1.

Figure 3:
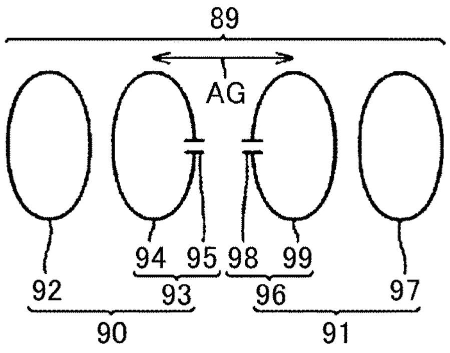
FIG. 3 is a schematic diagram illustrating the simulation model of a power transfer system.

Simulation results obtained by analyzing the relationship between a difference in natural frequency and power transfer efficiency are explained below with reference to FIGS. 3 and 4. FIG. 3 shows the simulation mode of a power transfer system. A power transmission system 89 is provided with a power transmitting unit 90 and a power receiving unit 91, and the power transmitting unit 90 includes an electromagnetic induction coil 92 and a power transmitting section 93. The power transmitting section 93 includes a resonant coil 94 and a capacitor 95 provided in the resonant coil 94.

The power receiving unit 91 includes a power receiving section 96 and an electromagnetic induction coil 97. The power receiving section 96 includes a resonant coil 99 and a capacitor 98 connected to the resonant coil 99.

The inductance of the resonant coil 94 is set to inductance Lt, and the capacitance of the capacitor 95 is set to capacitance C1. The inductance of the resonant coil 99 is set to inductance Lr, and the capacitance of the capacitor 98 is set to capacitance C2. Where the parameters are thus set, the natural frequency f1 of the power transmitting section 93 is represented by Eq. (1) below, and the natural frequency f2 of the power receiving section 96 is represented by Eq. (2) below $$f1=1/\{2\pi(LtX\ C1)^{1/2}\} \qquad \text{Eq. (1)}$$

$$f2=1/\{2\pi(LrX\ C2)^{1/2}\} \qquad \text{Eq. (2)}$$

Figure 4:
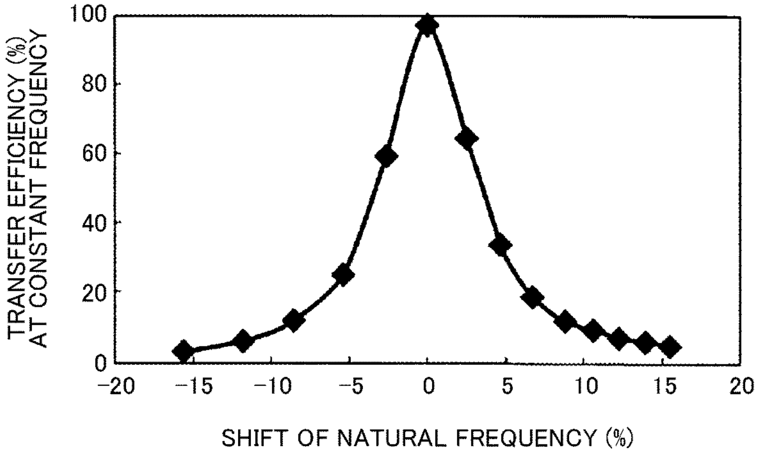
FIG. 4 shows the relationship of the shift between the natural frequencies of a power transmitting section 93 with a power receiving section 96 shown in FIG. 3 and power transfer efficiency.

FIG. 4 shows the relationship between a shift of natural frequencies' of the power transmitting section 93 and the power receiving section 96 and a power transfer efficiency. In the case shown in FIG. 4, the inductance Lr and the capacitances C1 and C2 are fixed and only the inductance Lt is varied.

In this simulation, the relative positional arrangement of the resonant coil 94 and the resonant coil 99 is fixed, and the frequency of electric current supplied to the power transmitting section 93 is constant.

In the graph shown in FIG. 4, the shift (%) of natural frequencies is plotted on the abscissa, and the power transfer efficiency (%) at a constant frequency is plotted against the ordinate. The shift (%) of natural frequencies is represented by Eq. (3) below.

$$(\text{Shift (\%) of natural frequencies})=\{(f1-f2)/f2\}\times 100\% \qquad \text{Eq. (3)}$$

As follows from FIG. 4, when the shift (%) of natural frequencies is ±0%, the power transfer efficiency approaches 100%. When the shift (%) of natural frequencies is ±5%, the power transfer efficiency is 40%. When the shift (%) of natural frequencies is ±10%, the power transfer efficiency is 10%. When the shift (%) of natural frequencies is ±15%, the power transfer efficiency is 5%. Thus, it is clear that the power transfer efficiency can be increased by setting the natural frequency of the power transmitting section and the power receiving section such that the absolute value (difference in natural frequency) of the shift (%) of natural frequencies is within a range equal to or less than 10% of the natural frequency of the power receiving section 96. It is also clear that the power transfer efficiency can be further increased by setting the natural frequency of the power transmitting section and the power receiving section such that the absolute value (difference in natural frequency) of the shift (%) of natural frequencies is within a range equal to or less than 5% of the natural frequency of the power receiving section 96. The electromagnetic field analysis software (JMAG (registered trade name): produced by JSOL Corporation) has been used as the simulation software.

The magnetic field of a specific frequency that is formed around the resonant coil in the power transmitting unit 220 shown in FIG. 1 will be explained below. The "magnetic field of a specific frequency", as referred to herein, typically correlates with the power transfer efficiency and the frequency of electric current supplied to the resonant coil of the power transmitting unit 220. Accordingly, the relationship between the power transfer efficiency and the frequency of electric current supplied to the resonant coil of the power transmitting unit 220 is initially explained. The power transfer efficiency attained when the electric power is transferred from the resonant coil of the power transmitting unit 220 to the resonant coil of the power receiving unit 110 varies depending on a variety of factors, such as a distance between the resonant coil of the power transmitting unit 220 and the resonant coil of the power receiving unit 110. For example, the natural frequency (resonant frequency) of the power transmitting unit 220 and the power receiving unit 110 is set to natural frequency f0, the frequency of the electric current supplied to the resonant coil of the power transmitting unit 220 is set to frequency f3, and the air gap between the resonant coil of the power receiving unit 110 and the resonant coil of the power transmitting unit 220 is set to air gap AG.

Figure 5:
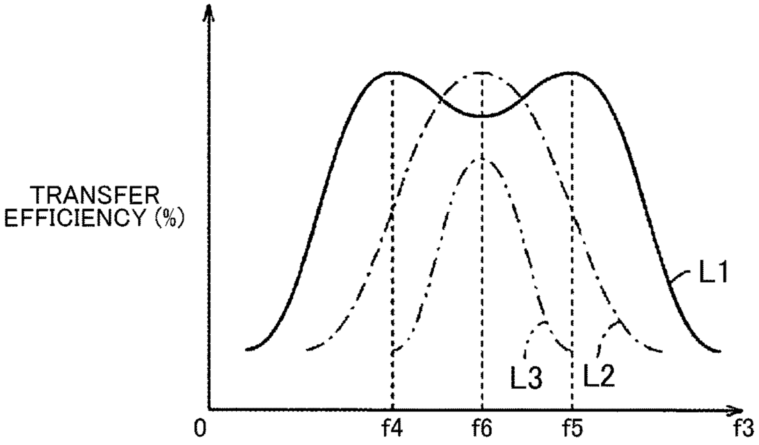
FIG. 5 is a graph showing the relationship between the power transfer efficiency when an air gap AG is varied and the frequency f3 of an electric current supplied to a resonant coil in the power transmitting unit in a state in which the natural frequency f0 is fixed.

FIG. 5 is a graph showing the relationship between the power transfer efficiency and the frequency f3 of the electric current supplied to the resonant coil of the power transmitting unit 220 shown in FIG. 1 at the time when the air gap AG is changed in a state in which the natural frequency f0 is fixed.

In the graph shown in FIG. 5, the frequency f3 of electric current supplied to the resonant coil of the power transmitting unit 220 is plotted against the abscissa, and the power transfer efficiency (%) is plotted against the ordinate. An efficiency curve L1 shows schematically the relationship between the power transfer efficiency and the frequency f3 of electric current supplied to the resonant coil of the power transmitting unit 220 when the air gap AG is small. As shown by the efficiency curve L1, when the air gap AG is small, the peaks of the power transfer efficiency appear at frequencies f4 and f5 (f4<f5). Where the air gap AG is increased, the two peaks in which the power transfer efficiency becomes high shift so as to approach each other. As shown by the efficiency curve L2, where the air gap AG is made larger than a predetermined distance, there is only one peak of the power transfer efficiency, and the power transfer efficiency peaks when the frequency of electric current supplied to the resonant coil of the power transmitting unit 220 is a frequency f6. Where the air gap AG is further increased with respect to that in the case of the efficiency curve L2, the peak of the power transfer efficiency decreases as shown in the efficiency curve L3.

For example, the following first method can be considered for increasing the power transfer efficiency. A method by which the characteristic of the power transfer efficiency between the power transmitting unit 220 and the power receiving unit 110 is changed by setting the constant frequency of electric current supplied to the resonant coil of the power transmitting unit 220, which is shown in FIG. 1, and changing the capacitance of the capacitor according to the air gap AG can be considered as the first method. More specifically, in a state with a constant frequency of electric current supplied to the resonant coil of the power transmitting unit 220, the capacitance of the capacitor is adjusted such that the power transfer efficiency reaches a maximum. With such a method, the frequency of electric current flowing in the resonant coil of the power transmitting unit 220 and the resonant coil of the power receiving unit 110 is constant regardless of the size of the air gap AG. A method of using a matching unit provided between the power transmitting unit 220 and the power supply unit 250, or a method of using a converter on the power reception side can be used for changing the characteristic of power transfer efficiency.

Further, with the second method, the frequency of electric current supplied to the resonant coil of the power transmitting unit 220 is adjusted on the basis of the size of the air gap AG. For example, as shown in FIG. 5, where the power transfer characteristic is the efficiency curve L1, in the resonant coil of the power transmitting unit 220, the electric current having a frequency equal to the frequency f4 or frequency f5 is supplied to the resonant coil of the power transmitting unit 220. Where the frequency characteristic is the efficiency curve L2 or L3, the electric current having a frequency equal to the frequency f6 is supplied to the resonant coil of the power transmitting unit 220. In this case, the frequency of electric current flowing in the resonant coil of the power transmitting unit 220 and the resonant coil of the power receiving unit 110 is changed according to the size of the air gap AG.

In the first method, the frequency of electric current flowing in the resonant coil of the power transmitting unit 220 is a fixed constant frequency, and in the second method, the frequency flowing in the resonant coil of the power transmitting unit 220 is changed, as appropriate, according to the air gap AG. With the first method or the second method, the electric current having a specific frequency set such that the power transfer efficiency becomes high is supplied to the resonant coil of the power transmitting unit 220. Where the electric current having the specific frequency flows in the resonant coil of the power transmitting unit 220, a magnetic field (electromagnetic field) oscillating at the specific frequency is formed around the resonant coil of the power transmitting unit 220. The power receiving unit 110 receives electric power from the power transmitting unit 220 through the magnetic field that is formed between the power receiving unit 110 and the power transmitting unit 220 and oscillates at the specific frequency. Therefore, the "magnetic field oscillating at the specific frequency" is not necessarily limited to a magnetic field having a fixed frequency. In the abovementioned example, the attention is focused on the air gap AG, and the frequency of electric current flowing in the resonant coil of the power transmitting unit 220 is set, but the power transfer efficiency also changes depending on other factors such as a horizontal displacement of the resonant coil of the power transmitting unit 220 and the resonant coil of the power receiving unit 110, and the frequency of electric current flowing in the resonant coil of the power transmitting unit 220 may be also adjusted on the basis of such other factors.

Figure 6:
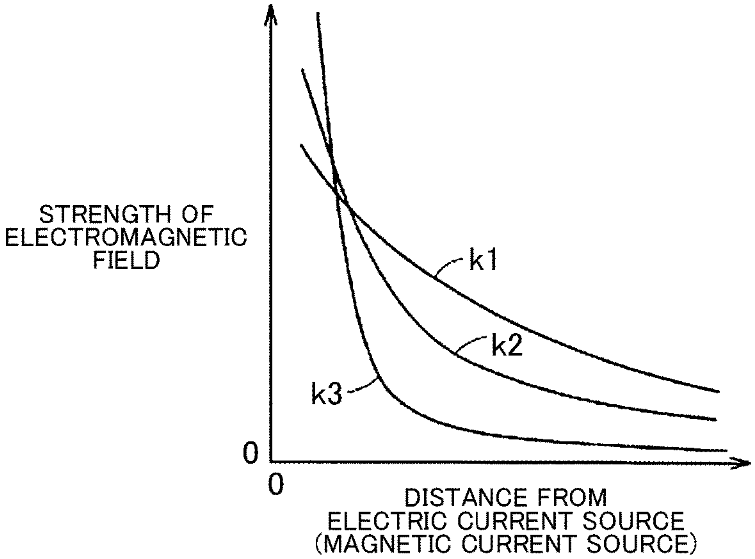
FIG. 6 shows the relationship between the distance from an electric current source or magnetic current source and the strength of an electromagnetic field.

In the power transfer system according to the embodiment, the power transfer and reception efficiency is increased by using a near field (evanescent field) in which the "static electromagnetic field" of the electromagnetic field is predominant. FIG. 6 shows the relationship between a distance from an electric current source or a magnetic current source and the strength of electromagnetic field. Referring to FIG. 6, the electromagnetic field is constituted by three components. A curve k1 represents a component inversely proportional to the distance from a wave source; this component is called "radiation electromagnetic field". A curve k2 represents a component inversely proportional to the second power of the distance from the wave source; this component is called "induction electromagnetic field". A curve k3 represents a component inversely proportional to the third power of the distance from the wave source; this component is called "static electromagnetic field". Where the wavelength of the electromagnetic field is denoted by "$\lambda$", a distance at which the strengths of the "radiation electromagnetic field", "induction electromagnetic field", and "static electromagnetic field" are substantially equal to each other can be represented by $\lambda/2\pi$.

The "static electromagnetic field" is a region in which the strength of the electromagnetic wave decreases rapidly with the distance from the wave source. In the power transfer system according to the embodiment, the transfer of energy (electric power) is performed using the near field (evanescent field) in which the "static electromagnetic field" is predominant. Thus, the power transmitting unit 220 and the power receiving unit 110 having the close natural frequencies (for example, a pair of LC resonant coils) are caused to resonate in the near field in which the "static electromagnetic field" is predominant, whereby the energy (electric power) is transferred from the power transmitting unit 220 to the other power receiving unit 110. Since the energy does not propagate to a large distance in the "static electromagnetic field", the resonance method enables power transfer at a lower energy loss by comparison with the electromagnetic wave that transmits energy (electric power) through the "radiation electromagnetic field" in which the energy propagates over a long distance.

Thus, in the power transfer system, the electric power is contactlessly transferred between the power transmitting section and the power receiving section by causing the power transmitting section and the power receiving section to resonate through the electromagnetic field. The coupling coefficient $\kappa$ between the power transmitting section and the power receiving section is, for example, equal to or less than about 0.3, preferably equal to or less than 0.1. It goes without saying that the coupling coefficient $\kappa$ within a range from 0.1 to about 0.3 may be also used. The coupling coefficient $\kappa$ is not limited to such values and can assume a variety of values at which power transfer is effective.

[Detailed Explanation of Configuration of Contactless Power Transfer]

Figure 7:
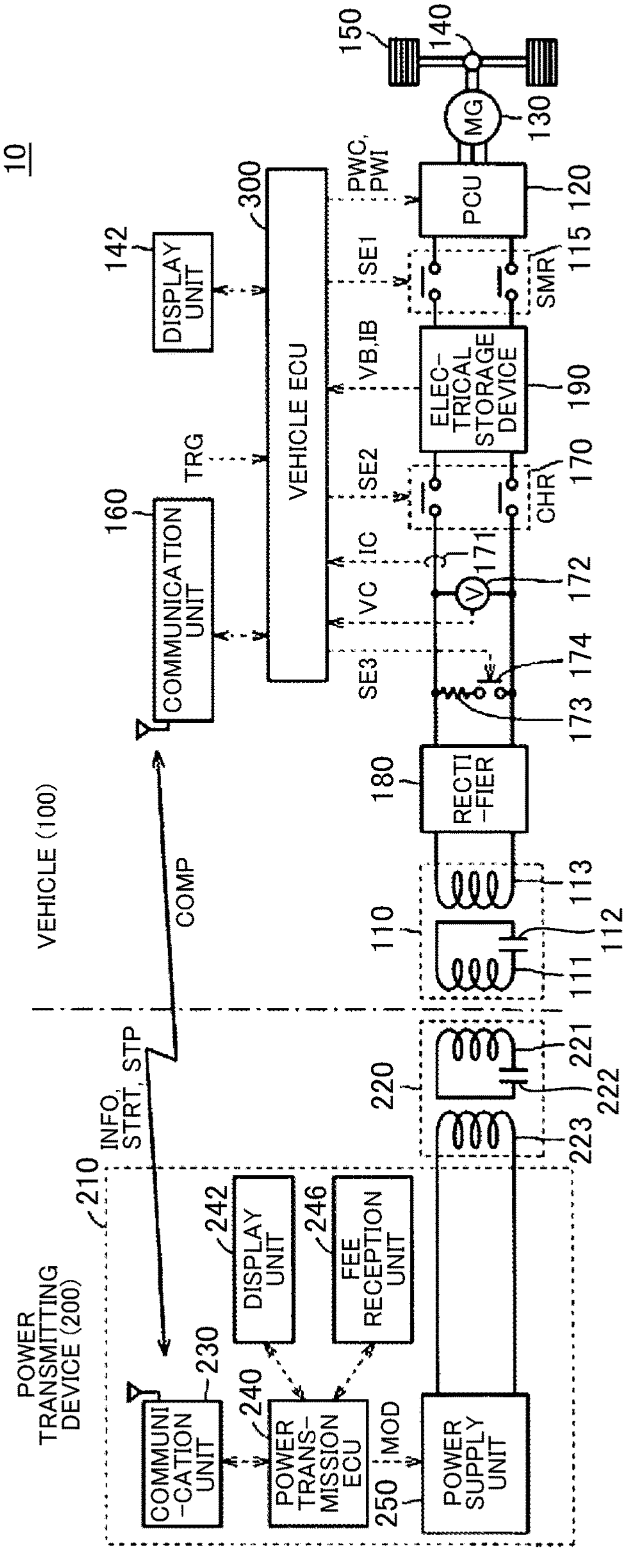
FIG. 7 is a circuit diagram showing the detailed configuration of the power transfer system 10 shown in FIG. 1.

FIG. 7 is a circuit diagram showing the detailed configuration of the power transfer system 10 shown in FIG. 1. Referring to FIG. 7, the vehicle 100 includes the rectifier 180, a charging relay (CHR) 170, the electrical storage device 190, a system main relay (SMR) 115, a power control unit (PCU) 120, a motor generator 130, a mechanical power transmission gear 140, drive wheels 150, a vehicle electronic control unit (ECU) 300, which is a control device, an electric current sensor 171, and a voltage sensor 172 in addition to the power receiving unit 110 and the communication unit 160. The power receiving unit 110 includes a coil 111 (referred to hereinbelow as a secondary self-resonant coil 111, and may be also suitably called "resonant coil"), a capacitor 112, and a secondary coil 113.

In the embodiment, an electric automobile is explained by way of example as the vehicle 100, but the configuration of the vehicle 100 is not limited, provided that the vehicle can travel by using the electric power stored in the electrical storage device. Other examples of the vehicle 100 include a hybrid vehicle equipped with an engine, and a fuel cell vehicle equipped with a fuel cell.

The secondary self-resonant coil 111 receives electric power from a primary self-resonant coil 221, which is included in the power transmitting device 200, by electromagnetic resonance using an electromagnetic field.

The number of turns and inter-coil distance are set, as appropriate, for the secondary self-resonant coil 111 on the basis of the distance to the primary self-resonant coil 221 of the power transmitting device 200 or the resonance frequency of the primary self-resonant coil 221 and the secondary self-resonant coil 111, such that a Q value indicating the resonance strength between the primary self-resonant coil 221 and the secondary self-resonant coil 111 is large (for example, Q>100) and the coupling coefficient (κ) representing the coupling degree thereof is small (for example, equal to or less than 0.1).

The capacitor 112 is connected to both ends of the secondary self-resonant coil 111 and forms together with the secondary self-resonant coil 111 an LC resonant circuit. The capacitance of the capacitor 112 is set, as appropriate, according to the inductance of the secondary self-resonant coil 111, such as to obtain the predetermined resonance frequency. When the desired resonance frequency is obtained by the stray capacitance of the secondary self-resonant coil 111 itself, the capacitor 112 can be omitted.

The secondary coil 113 is provided coaxially with the secondary self-resonant coil 111 and can be magnetically coupled to the secondary self-resonant coil 111 through electromagnetic induction. The secondary coil 113 takes out, by electromagnetic induction, the electric power received by the secondary self-resonant coil 111 and outputs the power to the rectifier 180.

The rectifier 180 rectified the AC power received from the secondary coil 113 and outputs the rectified DC power to the electrical storage device 190 through the CHR 170. For example, the rectifier 180 can be configured to include a diode bridge and a smoothing capacitor (not shown in the figure). The so-called switching regulator performing the rectification by using switching control can be also used as the rectifier 180, but the rectifier 180 can be also included in the power receiving unit 110, and from the standpoint of preventing malfunction of the switching element associated with the generated electromagnetic field, it is more preferred that a static rectifier, such as a diode bridge, be used.

In the configuration of the embodiment, the DC power rectified by the rectifier 180 is directly outputted to the electrical storage device 190, but when the DC voltage after the rectification is different from the charging voltage allowed for the electrical storage device 190, a DC/DC converter (not shown in the figure) for voltage conversion may be provided between the rectifier 180 and the electrical storage device 190.

A load resistor 173 and a relay 174 that are connected in series and serve for position detection are connected to an output portion of the rectifier 180. Before the full scale charging is started, small power is transmitted as a test signal from the power transmitting device 200 to the vehicle. In this case, the relay 174 is controlled and set to the energized state by a control signal SE3 from the vehicle ECU 300.

The voltage sensor 172 is provided between a pair of power lines connecting the rectifier 180 and the electrical storage device 190. The voltage sensor 172 detects a secondary-side DC voltage of the rectifier 180, that is, the power reception voltage received from the power transmitting device 200, and outputs the detected value VC to the vehicle ECU 300. The vehicle ECU 300 determines a power reception efficiency on the basis of the voltage VC and sends information relating to the power reception efficiency to the power transmitting device via the communication unit 160.

The electric current sensor 171 is provided in a power line connecting the rectifier 180 to the electrical storage device 190. The electric current sensor 171 detects a charging current flowing to the electrical storage device 190, and outputs the detected value IC to the vehicle ECU 300.

The CHR 170 is electrically connected to the rectifier 180 and the electrical storage device 190. The CHR 170 is controlled by a control signal SE2 from the vehicle ECU 300 and switches between supply and interruption of electric power from the rectifier 180 to the electrical storage device 190.

The electrical storage device 190 is a power storage element constituted to be chargeable and dischargeable. The electrical storage device 190 is configured to include, for example, a secondary battery such as a lithium ion battery, a nickel hydride battery, or a lead acid battery, or a power storage element such as an electric double layer capacitor.

The electrical storage device 190 is connected to the rectifier 180 via the CHR 170. The electrical storage device 190 stores electric power that is received by the power receiving unit 110 and rectified by the rectifier 180. Further, the electrical storage device 190 is also connected to the PCU 120 via the SMR 115. The electrical storage device 190 supplies electric power for generating the drive power for the vehicle to the PCU 120. The electrical storage device 190 also stores the electric power generated by the motor generator 130. The output of the electrical storage device 190 is, for example, about 200 V.

The electrical storage device 190 is provided with a voltage sensor and a current sensor (not shown in the figures) for detecting a voltage VB of the electrical storage device 190 and an inputted/outputted current IB. The detected values of voltage and current are outputted to the vehicle ECU 300. The vehicle ECU 300 calculates the charging state (also referred to as "state of charge (SOC)") of the electrical storage device 190 on the basis of the voltage VB and current 1B.

The SMR 115 is inserted into a power line connecting the electrical storage device 190 to the PCU 120. The SMR 115 is controlled by a control signal SE1 from the vehicle ECU 300 and switches between supply and interruption of electric power between the electrical storage device 190 and the PCU 120.

The PCU 120 includes a converter and an inverter (not shown in the figures). The converter is controlled by a control signal PWC from the vehicle ECU 300 and converts the voltage from the electrical storage device 190. The inverter is controlled by a control signal PWI from the vehicle ECU 300 and uses the electric power converted by the converter to drive the motor generator 130.

The motor generator 130 is an AC rotating electric machine, for example, a synchronous electric machine of a permanent magnet type which is provided with a rotor in which a permanent magnets is embedded.

The output torque of the motor generator 130 is transmitted through the mechanical power transmission gear 140 to the drive wheels 150 to drive the vehicle 100. During regenerative braking operation of the vehicle 100, the motor generator 130 can generate electric power by using the rotational force of the drive wheels 150. The generated electric power is converted by the PCU 120 into the charging power for charging the electrical storage device 190.

In a hybrid automobile equipped with an engine (not shown in the figure) in addition to the motor generator 130, the necessary vehicle drive power is generated by cooperative operation of the engine and the motor generator 130. In this case, the electrical storage device 190 can be also charged by using the electric power generated by the rotation of the engine.

The communication unit 160 is, as described hereinabove, a communication interface for performing wireless communication between the vehicle 100 and the power transmitting device 200. The communication unit 160 outputs battery information INFO, including the SOC, relating to the electrical storage device 190 from the vehicle ECU 300 to the power transmitting device 200. The communication unit 160 also outputs signals STRT and STP, which instruct the power transmitting device 200 to start and stop the transmission of power, to the power transmitting device 200.

The vehicle ECU 300 includes a central processing unit (CPU), a storage device, and an input/output buffer (not shown in FIG. 7), inputs signals from the sensors and outputs control signals to the devices, and also controls the vehicle 100 and the devices. The control operations can be performed not only by processing with software, but also by using dedicated hardware (electronic circuits).

Where a charging start signal TRG produced by the user's operation is received, the vehicle ECU 300 outputs the signal STRT, which instructs the power transmitting device 200 to start the transmission of power, through the communication unit 160 on the basis of whether a predetermined condition is fulfilled. Where the electrical storage device 190 is fully charged or in response to the user's operation, the vehicle ECU 300 outputs a signal STP, which instructs the power transmitting device 200 to stop the transmission of power, through the communication unit 160.

The power transmitting device 200 includes a charging stand 210 and the power transmitting unit 220. The charging stand 210 includes a power transmission ECU 240, which is a control device, the power supply unit 250, a display unit 242, and a fee reception unit 246 in addition to the communication unit 230. The power transmitting unit 220 includes the coil 221 (referred to hereinbelow as primary self-resonant coil 221, and may be also suitably called "resonant coil"), a capacitor 222, and a primary coil 223.

The power supply unit 250 is controlled by a control signal MOD from the power transmission ECU 240 and converts the electric power received from the AC power supply, such as a commercial power supply, into high-frequency electric power. The power supply unit 250 supplies the converted high-frequency electric power to the primary coil 223.

In FIG. 7, a matching unit performing impedance conversion is not shown, but the configuration in which the matching unit is provided between the power supply unit 250 and the power transmitting unit 220, or between the power receiving unit 110 and the rectifier 180 may be also used.

The primary self-resonant coil 221 transfers electric power by electromagnetic resonance to the secondary self-resonant coil 111 included in the power receiving unit 110 of the vehicle 100.

The number of turns and inter-coil distance are set, as appropriate, for the primary self-resonant coil 221 on the basis of the distance to the secondary self-resonant coil 111 of the vehicle 100, or the resonance frequency of the primary self-resonant coil 221 and the secondary self-resonant coil 111, such that the Q value indicating the resonance strength between the primary self-resonant coil 221 and the secondary self-resonant coil 111 is large (for example, Q>100) and the coupling coefficient (κ) representing the coupling degree thereof is small (for example, equal to or less than 0.1).

The capacitor 222 is connected to both ends of the primary self-resonant coil 221 and forms together with the primary self-resonant coil 221 an LC resonant circuit. The capacitance of the capacitor 222 is set, as appropriate, according to the inductance of the primary self-resonant coil 221, such as to obtain a predetermined resonance frequency. When the desired resonance frequency is obtained with the stray capacitance of the primary self-resonant coil 221 itself, the capacitor 222 can be omitted.

The primary coil 223 is provided coaxially with the primary self-resonant coil 221 and can be magnetically coupled to the primary self-resonant coil 221 through electromagnetic induction. The primary coil 223 transmits, through electromagnetic induction, the high-frequency electric power, which is supplied through a matching unit 260, to the primary self-resonant coil 221.

As described hereinabove, the communication unit 230 is a communication interface for performing wireless communication between the power transmitting device 200 and the vehicle 100. The communication unit 230 receives the battery information INFO transmitted from the communication unit 160 on the vehicle 100 side, and also the signal STRT or signal STP instructing to start or stop the transmission of power, and outputs the information and signal to the power transmission ECU 240.

Cash, a prepaid card, or a credit card is inserted into the fee reception unit 246 prior to power charging. The power transmission ECU 240 causes the electric power supply unit 250 to send a test signal of very low power. The "very low power", as referred to herein, is electric power that is less than a charging power for charging the battery after verification, or an electric power that is transmitted during the alignment, and may be an electric power that is transmitted intermittently.

The vehicle ECU 300 sends the control signals SE2 and SE3 such that the relay 174 is switched on and the CHR 170 is switched off in order to receive the test signal. The power reception efficiency and charging efficiency are then calculated on the basis of the voltage VC. The vehicle ECU 300 sends the calculated charging efficiency or power reception efficiency by the communication unit 160 to the power transmitting device 200.

The display unit 242 of the power transmitting device 200 displays the charging efficiency or the a charging power unit price corresponding to the charging efficiency to the user. The display unit 242 may also have a function, for example, of an input unit, such as a touch panel, and can receive an input as to whether or not the user approves of the charging power unit price.

The power transmission ECU 240 causes the power supply unit 250 to start full scale charging when the charging power unit price is approved. Where the charging is completed, the fee is paid at the fee reception unit 246.

The power transmission ECU 240 includes a CPU, a storage device, and an input/output buffer (not shown in FIG. 7), inputs signals from the sensors and outputs control signals to the devices, and also controls the devices in the charging stand 210.

The control operations can be performed not only by processing with software, but also by using dedicated hardware (electronic circuits).

The relationship between the power transmitting unit 90 and the power receiving unit 91, which is explained in FIGS. 3 and 4, is valid with respect to the transmission of electric power from the power transmitting device 200 to the vehicle 100. In the power transfer system shown in FIG. 7, the difference between the natural frequency of the power transmitting unit 220 and the natural frequency of the power receiving unit 110 is within ±10% of the natural frequency of the power transmitting unit 220 or the natural frequency of the power receiving unit 110. By setting the natural frequencies of the power transmitting unit 220 and the power receiving unit 110 within such a range, it is possible to increase the power transfer efficiency. Meanwhile, where the difference in natural frequency is greater than ±10%, the power transfer efficiency becomes less than 10% and the power transfer time is inconveniently extended.

The vehicle 100 further communicates with the power transmitting device 200 and includes a display unit 142 that displays a determination result as to whether the power transmitting unit 220 is compatible with the power receiving unit 110 of the vehicle 100.

Figure 8:
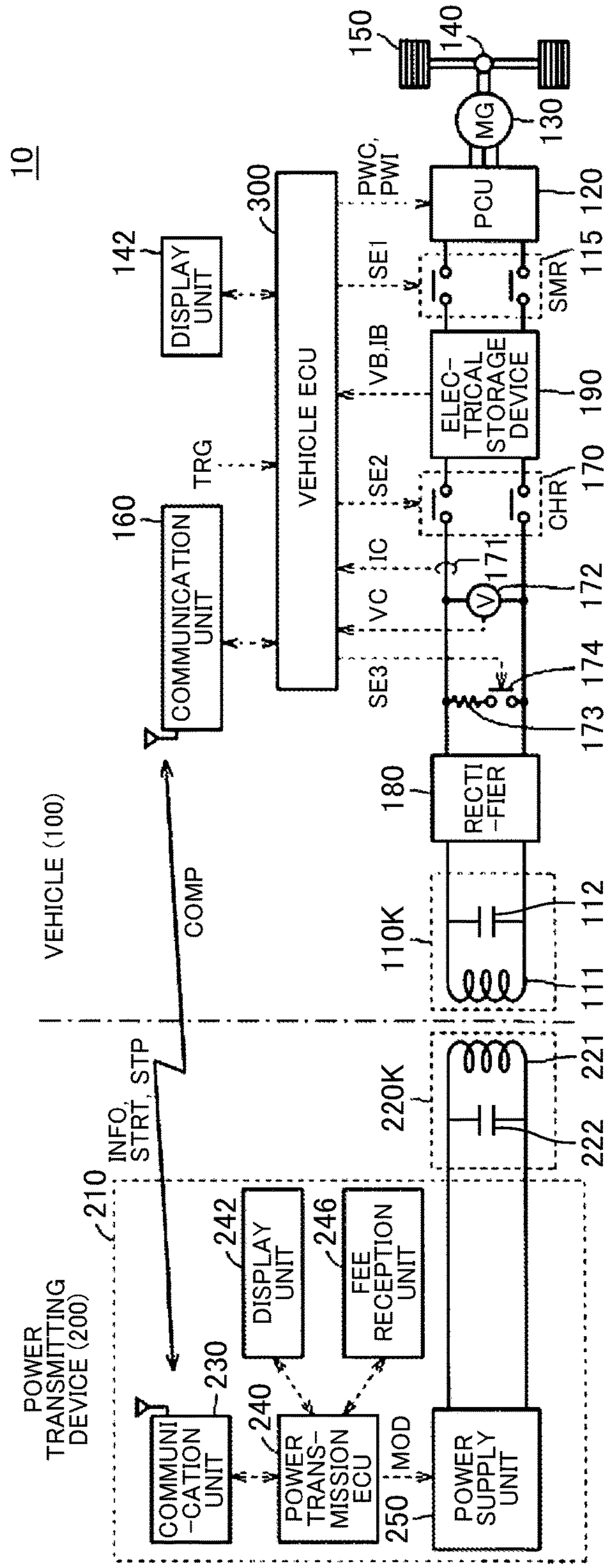
FIG. 8 shows variation examples of the power transmitting unit and power receiving unit.

FIG. 8 shows a variation example of the power transmitting unit and the power receiving unit.

As shown in FIG. 8, the electromagnetic induction coils 113 and 223 shown in FIG. 7 may not be interposed. In the configuration shown in FIG. 8, the power transmitting device 200 is provided with a power transmitting unit 220K, and the vehicle 100 is provided with a power receiving unit 110K.

The power transmitting unit 220K includes the self-resonant coil 221 connected to the power supply unit 250, and the capacitor 222 connected to the power supply unit 250 in parallel with the self-resonant coil 221.

The power receiving unit 110K includes the self-resonant coil 121 connected to the rectifier 180, and the capacitor 112 connected to the rectifier 180 in parallel with the self-resonant coil 121.

The configuration of other components in FIG. 8 is the same as that illustrated in FIG. 7, and the explanation thereof is not repeated herein.

[Coil Types of Power Transmitting Unit and Power Receiving Unit]

The coils of the power transmitting unit and power receiving unit are typically of a circular type in which the magnetic flux passes through the center of the coil and a polarized type in which the magnetic flux passes through from one end of the coil to the other end of the coil. The polarized coil type is further classified into a longitudinally-oriented polarized type and a laterally-oriented polarized type, depending on whether the direction in which the magnetic flux passes is the longitudinal or lateral direction of the vehicle.

Figure 9:
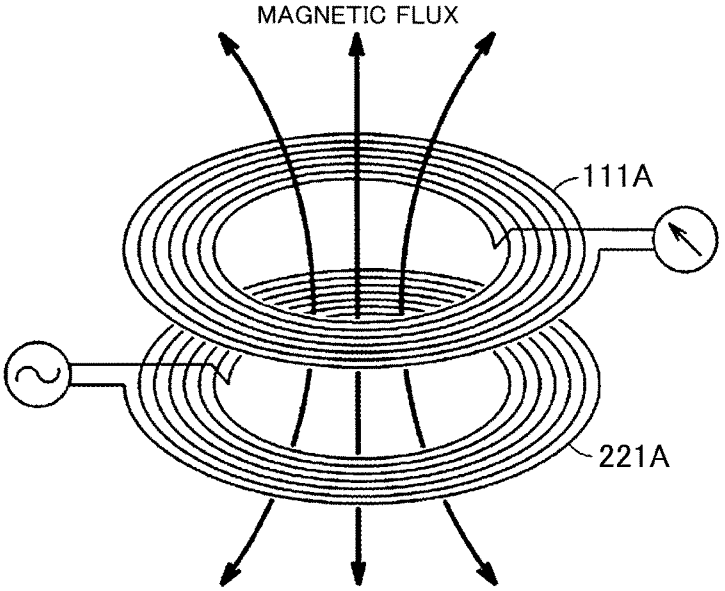
FIG. 9 illustrates a circular coil unit.

FIG. 9 illustrates the circular coil unit.

Referring to FIG. 9, in the circular coil unit, the power transmitting unit includes a power transmitting coil 221A, and the power receiving unit includes a power receiving coil 111A.

Figure 10:
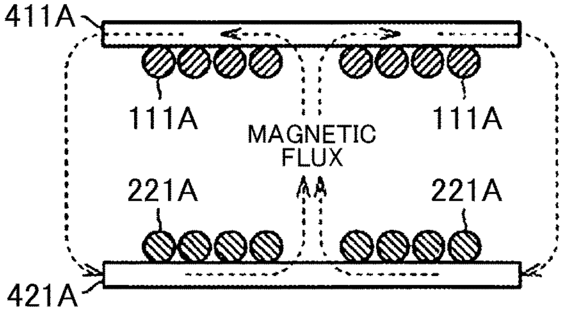
FIG. 10 illustrates a passage path of magnetic flux in the circular coil unit.

FIG. 10 illustrates the passage path of magnetic flux in the circular coil unit.

Referring to FIGS. 9 and 10, in the circular coil unit, the magnetic flux passes through the center portion of the circular coil. A hollow portion located close to the center of the outer shape circle of each circular coil and having no winding is called center portion. The magnetic flux passing through from the center portion of the power transmitting coil 221A to the center portion of the power receiving coil 111A passes through the inside a magnetic material 411A toward the outside, returns around the outside of the coil winding, passes through the inside a magnetic material 421A toward the center portion, and returns to the center portion of the power transfer coil 221A. Since an AC current flows in the power transmitting unit, where the orientation of the electric current flowing in the coil is reversed, the orientation of the magnetic flux is also reversed.

Figure 11:
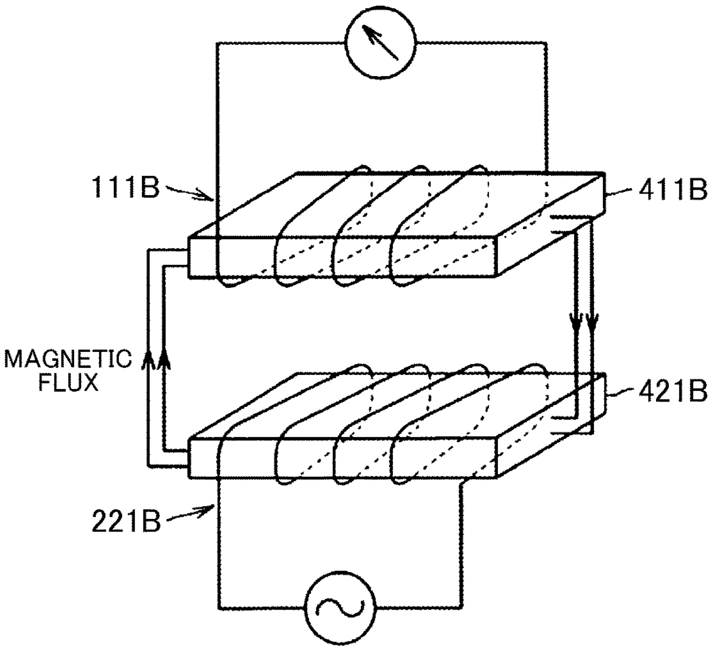
FIG. 11 illustrates a polarized coil unit.

FIG. 11 illustrates the polarized coil unit.

Referring to FIG. 11, in the polarized coil unit, the power transfer unit includes a power transmitting coil 221B, and the power receiving unit includes a power receiving coil 111B. The power transmitting coil 221B is wound around a plate-shaped magnetic material 421B. The power receiving coil 111B is wound around a plate-shaped magnetic material 411B.

Figure 12:
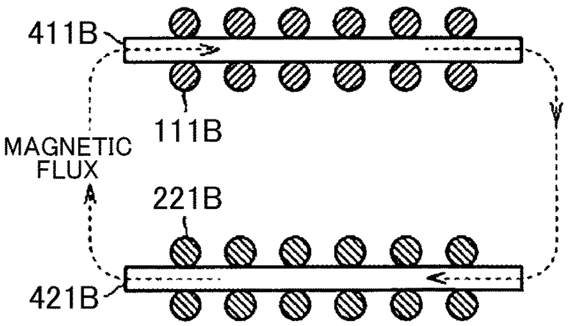
FIG. 12 illustrates the passage path of magnetic flux in the polarized coil unit.

FIG. 12 illustrates the passage path of magnetic flux in the polarized coil unit.

Referring to FIGS. 11 and 12, in the polarized coil unit, the magnetic flux passes through the center portion (the inside the magnetic material) of the coil wound on the magnetic material. The magnetic flux that has passed through the inside of the magnetic material 421B from one end to the other end of the power transmitting coil 221B and then toward the one end of the power receiving coil 111B, passes through the inside of the magnetic material 411B from one end to the other end of the power receiving coil 111B and returns to the one end of the power transmitting coil 221B. Since an AC current flows in the power transmitting unit, where the orientation of the electric current flowing in the coil is reversed, the orientation of the magnetic flux is also reversed.

Where the polarized-type power transmitting coil 221B and power receiving coil 111B are arranged at respective positions of the power transmitting unit 220 and power receiving unit 110 shown in FIG. 1, the direction in which the magnetic flux passes through the coils is different from that in the circular coil unit, and can be set in the longitudinal or lateral direction (width direction) of the vehicle.

Figure 13:
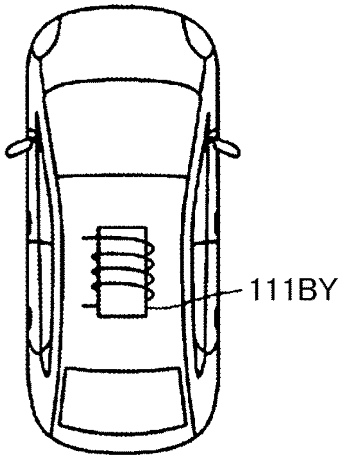
FIG. 13 illustrates a longitudinally-oriented polarized coil unit.

FIG. 13 illustrates a longitudinally-oriented polarized coil unit.

Referring to FIG. 13, a longitudinally-oriented polarized-type power receiving coil 111 BY is arranged at a vehicle such that the passage direction of the magnetic flux is the longitudinal direction of the vehicle. In other words, the power receiving coil 111BY is arranged at the vehicle such that the coil winding axis direction is the longitudinal direction of the vehicle.

Figure 14:
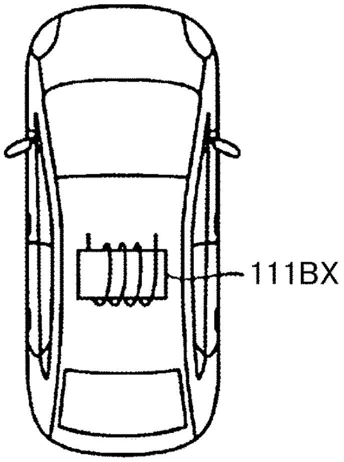
FIG. 14 illustrates a laterally-oriented polarized coil unit.

FIG. 14 illustrates a laterally-oriented polarized coil unit.

Referring to FIG. 14, a laterally-oriented polarized-type power receiving coil 111BX is arranged at a vehicle such that the passage direction of the magnetic flux is the lateral direction of the vehicle (vehicle width direction). In other words, the power receiving coil 111BY is arranged at the vehicle such that the coil winding axis direction is the lateral direction of the vehicle.

In FIGS. 13 and 14, the case in which the polarized coil unit is arranged at the vehicle 100 is explained by way of example. In the power transmitting device, the polarized coil unit can be also classified into a longitudinally-oriented polarized coil unit and a laterally-oriented polarized coil unit, depending on whether the passage direction of the magnetic flux is the longitudinal direction or the lateral direction of the parked vehicle.

[Contents of Communication Between Power Transmitting Device and Power Receiving Device]

Figure 15:
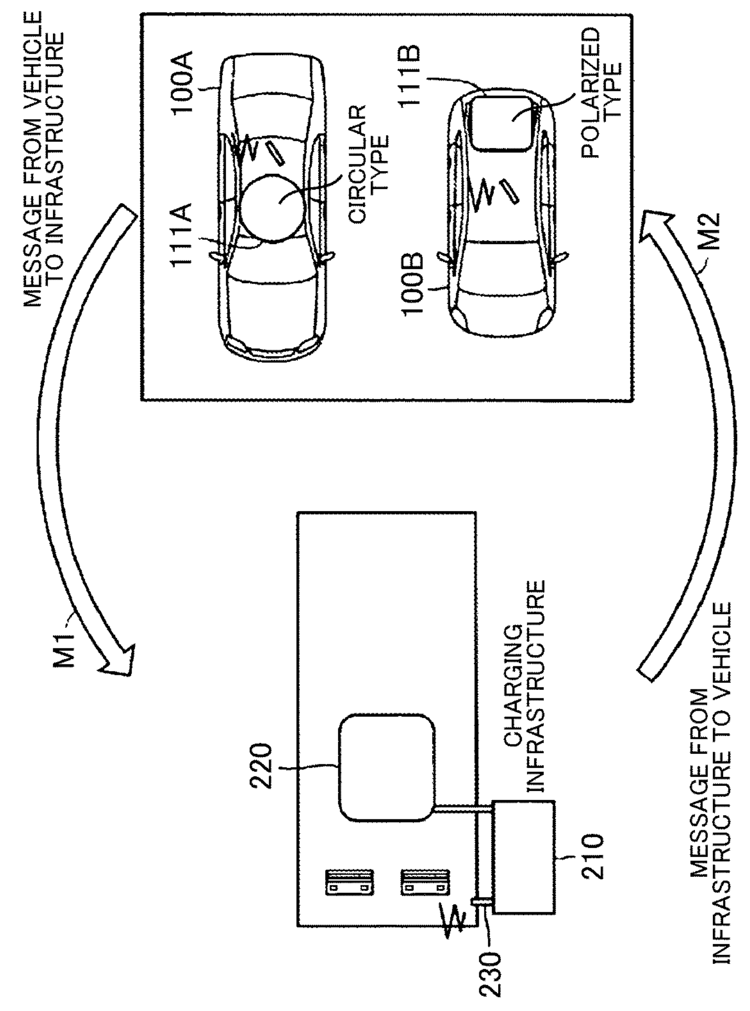
FIG. 15 illustrates the operation of a contactless power transfer system according to Embodiment 1.

FIG. 15 illustrates the operation of the contactless power transfer system according to Embodiment 1.

Referring to FIG. 15, a vehicle 100A is a vehicle in which the circular-type power receiving coil 111A is installed. A vehicle 100B is a vehicle in which the polarized-type power receiving coil 111B is installed.

The vehicles 100A and 100B each send to the communication unit 230 of the power transmitting device a message M1 including information about whether the type of the coil unit installed at the host vehicle is the circular type, the longitudinally-oriented polarized type or the laterally-oriented polarized type. The information that indicates each of coil types, that is, the circular type, the longitudinally-oriented polarized type and the laterally-oriented polarized type, is an example of information indicating a magnetic flux passage characteristic that represents how the magnetic flux passes in the coil unit. The information to be sent may be represented in another format, provided that it indicates the magnetic flux passage characteristic.

Whether or not the vehicles are chargeable by a charging infrastructure is determined on the basis of the message M1 sent from the corresponding vehicle, and a message M2, which indicates the determination result, is returned to the corresponding vehicle.

Since the message M2 is received and the possibility/impossibility of charging is displayed on the display unit, the user can recognize whether the vehicle is chargeable at the charging facility, without parking the vehicle at a parking position. Therefore, it is convenient at the time when the user determines whether to use the charging facility.

Figure 16:
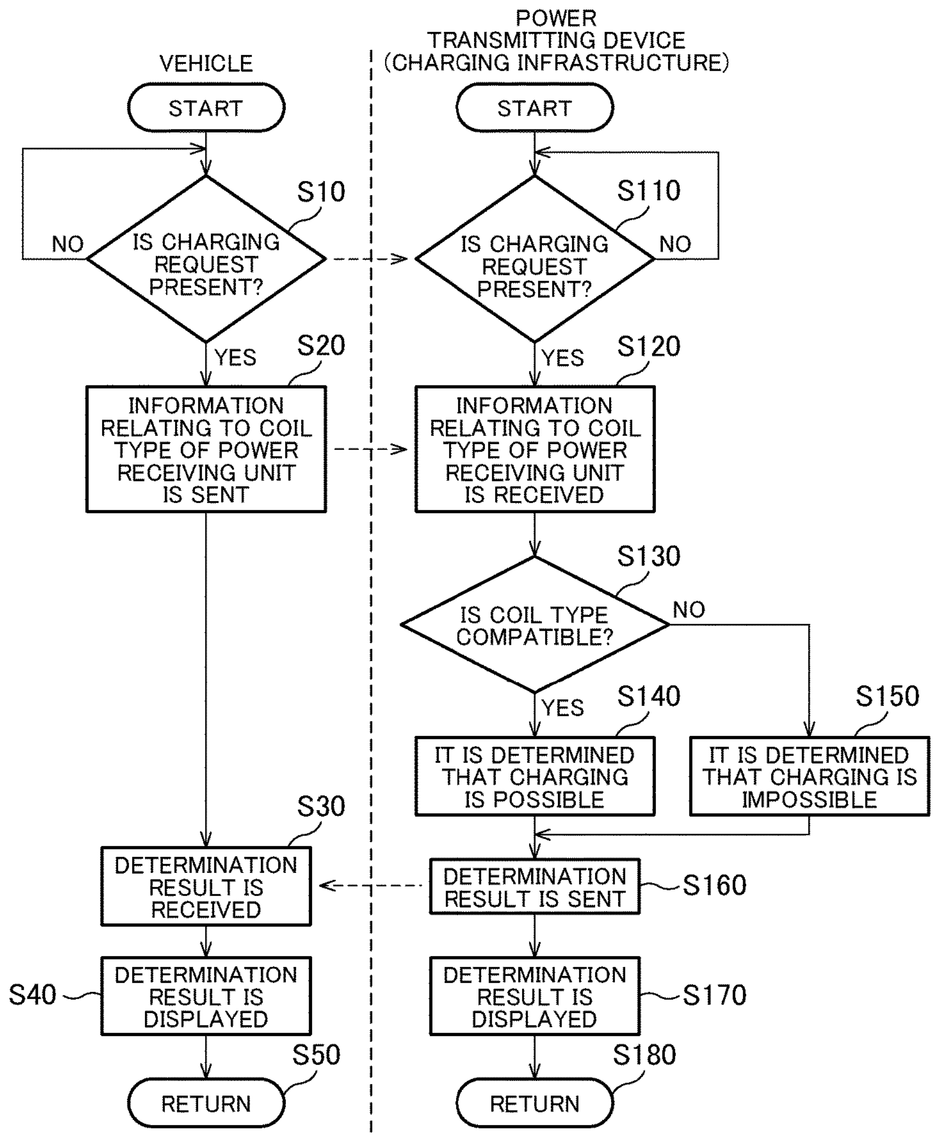
FIG. 16 is a flowchart illustrating control that is executed in a vehicle and a power transmitting device in Embodiment 1.

FIG. 16 is a flowchart for illustrating control that is executed in the vehicle and the power transmitting device in Embodiment 1.

Referring to FIGS. 7 and 16, in the vehicle 100, in step S10, the vehicle ECU 300 monitors whether there is a charging request. When the input of the charging start signal TRG by the user's operation is detected, the vehicle ECU 300 sends information to the effect that there is a charging request to the power transmitting device 200 via the communication unit 160. The processing then advances from step S10 to step S20.

Meanwhile, in the power transmitting device 200, in step S110, the power transmission ECU 240 monitors whether there is a charging request. Where information to the effect that there is a charging request is sent from the communication unit 160 of the vehicle 100, and the power transmission ECU 240 detects the charging request via the communication unit 230, the processing advances from step S110 to step S120.

In the vehicle 100, in step S20, information relating to the coil type of the power receiving unit 110 is sent by the communication unit 160 toward the power transmitting device 200. In the power transmitting device 200, in step S120, the information relating to the coil type of the power receiving unit 110 is received by the communication unit 230. The information relating to the coil type, for example, includes information about whether the coil is of the circular type, the polarized type, the longitudinally-oriented polarized type, or the laterally-oriented polarized type.

In step S130, the power transmission ECU 240 determines whether the coil type of the power receiving unit is compatible with the coil type of the power transmitting unit on the basis of information relating to the coil type of the power receiving unit received in step S120.

Where the coil type is determined in step S130 to be incompatible, the processing advances to step S150, and the power transmission ECU 240 confirms the determination of impossibility of charging. Meanwhile, where the coil type is determined in step S130 to be compatible, the processing advances to step S140, and the power transmission ECU 240 confirms the determination of possibility of charging.

In step S160, the power transmission ECU 240 sends the determination result confirmed in step S140 or step S150 to the vehicle ECU 300. The power transmission ECU 240 also causes the display unit 242 of the power transmitting device 200 to display the determination result in step S170.

In the vehicle 100, the determination result is received by the communication unit 160 in step S30, and the vehicle ECU 300 causes the display unit 142, such as a liquid crystal display, to display the determination result in step S40. The determination result may be provided to the driver by voice instead of displaying on the display unit 142.

Where the above-described processing is ended, the processing returns to the main routine of the vehicle and the power transmitting device in step S50 and step S180.

Figure 17:
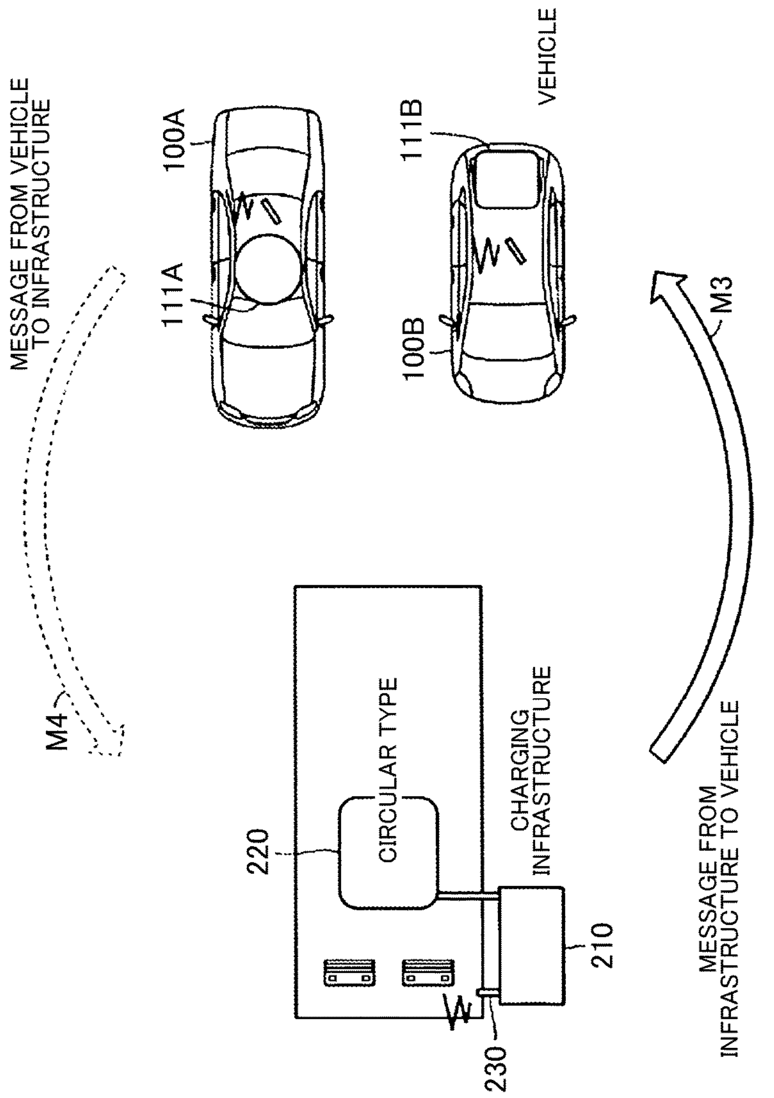
FIG. 17 illustrates the operation of the contactless power transfer system of a variation example of Embodiment 1.

FIG. 17 illustrates the operation of the contactless power transfer system of a variation example of Embodiment 1.

Referring to FIG. 17, the vehicle 100A is equipped with the circular-type power receiving coil 111A. The vehicle 100B is equipped with the polarized-type power receiving coil 111B. In this case, it is assumed that the polarized-type power transmitting unit 220 is arranged in the power transmitting device 200 which is the charging infrastructure.

The communication unit 230 of the power transmitting device sends to the communication unit 230 of the power transmitting device a message M3 including information that indicates whether the type of the coil unit installed at the power transmitting device is the circular type, the longitudinally-oriented polarized type or the laterally-oriented polarized type. The information that indicates each of coil types, that is, the circular type, the longitudinally-oriented polarized type and the laterally-oriented polarized type, is an example of information indicating a magnetic flux passage characteristic. The information to be sent may be represented in another format, provided that it indicates the magnetic flux passage characteristic.

The ECU of the vehicles 100A and 100B determine whether or not the vehicles are chargeable by the charging infrastructure on the basis of the message M3 sent from the power transmitting device, and the result is displayed to the user of the vehicle.

Since the possibility/impossibility of charging is displayed on the display unit, the user can recognize whether the vehicle is chargeable at the charging facility, without parking the vehicle at a parking position. Therefore, it is convenient at the time when the user determines whether to use the charging facility.

A message M4 indicating whether charging is to be performed is returned to the charging infrastructure.

Figure 18:
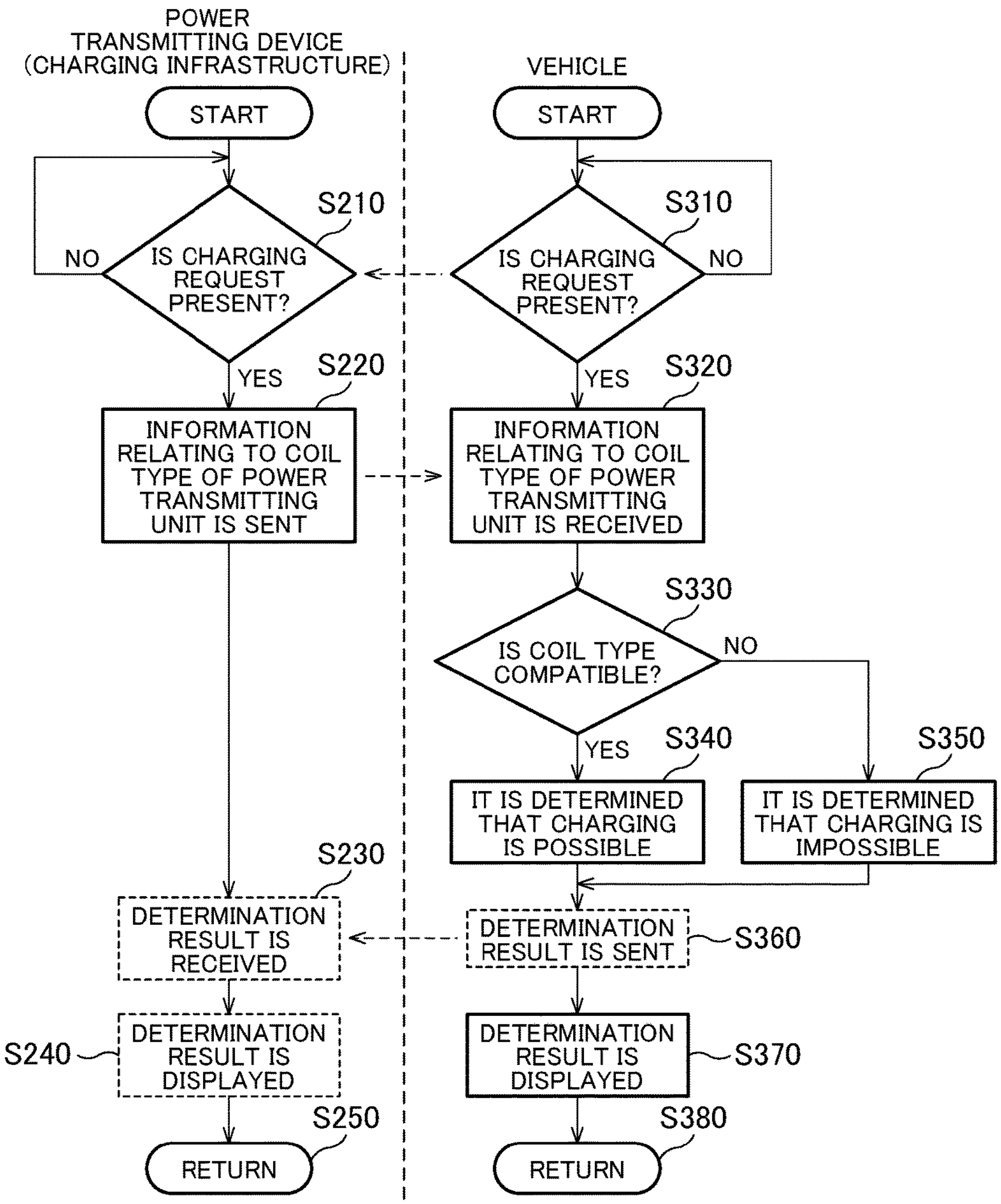
FIG. 18 is a flowchart illustrating control executed in the vehicle and power transmitting device in the variation example of Embodiment 1.

FIG. 18 is a flowchart for illustrating control that is executed in the vehicle and the power transmitting device in a variation example of Embodiment 1.

Referring to FIGS. 7 and 18, in the vehicle 100, in step S310, the vehicle ECU 300 monitors whether there is a charging request. When the input of the charging start signal TRG by the user's operation is detected, the vehicle ECU 300 sends information to the effect that there is a charging request to the power transmitting device 200 via the communication unit 160. The processing then advances from step S310 to step S320.

Meanwhile, in the power transmitting device 200, in step S210, the power transmission ECU 240 monitors whether there is a charging request. Where information to the effect that there is a charging request is sent from the communication unit 160 of the vehicle 100, and the power transmission ECU 240 detects the charging request via the communication unit 230, the processing advances from step S210 to step S220.

In the power transmitting device 200, in step S220, information relating to the coil type of the power transmitting unit 220 is sent by the communication unit 230 toward the vehicle 100. In the vehicle 100, in step S320, the information relating to the coil type of the power transmitting unit 220 is received by the communication unit 160. The information relating to the coil type, for example, includes information about whether the coil is of the circular type, the polarized type, the longitudinally-oriented polarized type, or the laterally-oriented polarized type.

In step S330, the vehicle ECU 300 determines whether the coil type of the power transmitting unit 220 is compatible with the coil type of the power receiving unit 110 on the basis of information relating to the coil type of the power transmitting unit 220 received in step S320.

Where the coil type is determined in step S330 to be incompatible, the processing advances to step S350, and the vehicle ECU 300 confirms the determination of impossibility of charging. Meanwhile, where the coil type is determined in step S330 to be compatible, the processing advances to step S340, and the vehicle ECU 300 confirms the determination of possibility of charging.

In step S360, the vehicle ECU 300 sends the determination result confirmed in step S340 or step S350 to the power transmission ECU 240. The vehicle ECU 300 also causes the display unit 142 to display the determination result in step S370.

In the power transmitting device 200, the determination result is received by the communication unit 230 in step S230, and the determination result is displayed on the display unit 242, such as a liquid crystal display, in step S240. The determination result may be provided to the driver by voice instead of displaying on the display unit 242.

Where the above-described processing is ended, the processing returns to the main routine of the power transmitting device and the vehicle in step S250 and step S380.

In FIG. 18, the processing of steps S230, S240, and S360 may not be performed.

Figure 19:
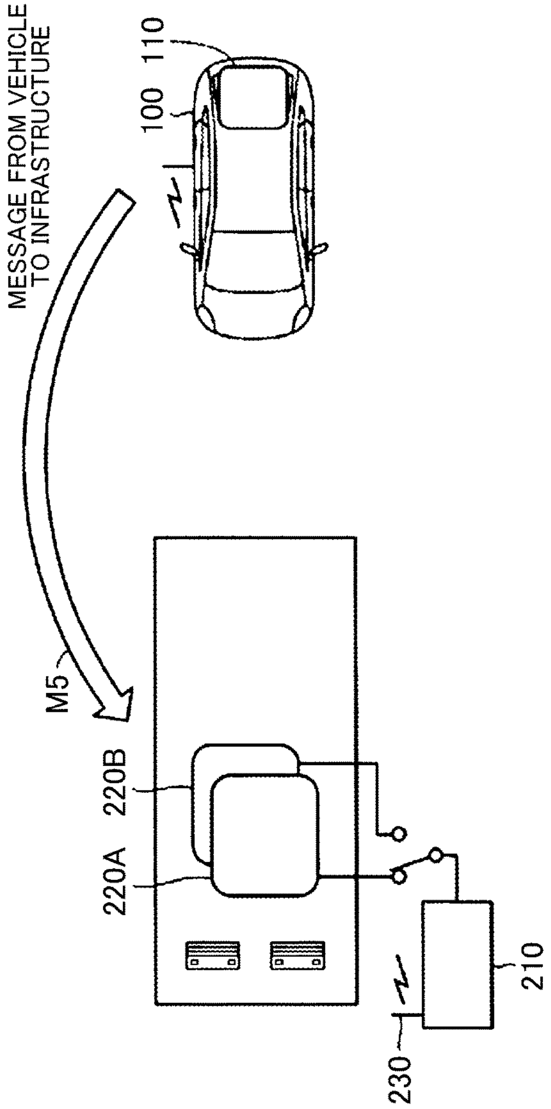
FIG. 19 illustrates the operation of the contactless power transfer system of Embodiment 2.

FIG. 19 illustrates the operation of the contactless power transfer system of Embodiment 2.

Referring to FIG. 19, the vehicle 100 is equipped with the power receiving unit 110 including the circular-type or polarized-type coil unit.

The power transmitting device includes a power transmitting unit 220A and a power transmitting unit 220B. The power transmitting unit 220A includes a circular-type coil unit. The power transmitting unit 220B includes a polarized-type coil unit.

The vehicle 100 sends to the communication unit 230 of the power transmitting device a message M5 including information about whether the type of the coil unit installed at the host vehicle is the circular type, the longitudinally-oriented polarized type or the laterally-oriented polarized type. The information that indicates each of coil types, that is, the circular type, the longitudinally-oriented polarized type and the laterally-oriented polarized type, is an example of information indicating a magnetic flux passage characteristic. The information to be sent may be represented in another format, provided that it indicates the magnetic flux passage characteristic.

The power transmitting device 200 selects and uses a power transmitting-unit corresponding to the power receiving unit of the vehicle on the basis of information received by the communication unit 230.

Even when the coils of the power receiving units installed on the vehicles are of a plurality of types, the power transfer system of Embodiment 2 can be adapted for vehicles of various types.

Figure 20:
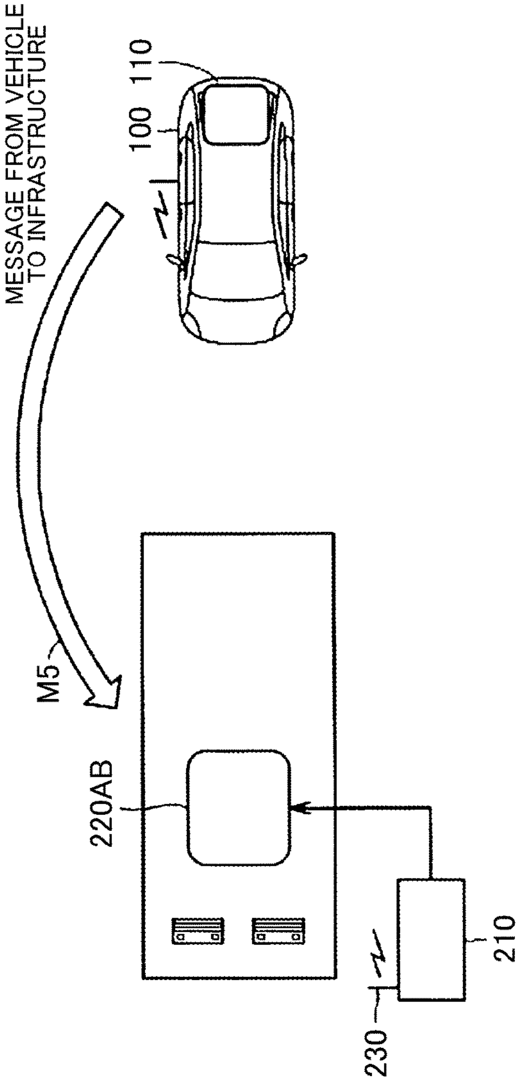
FIG. 20 illustrates the operation of the contactless power transfer system of the variation example shown in FIG. 19.

FIG. 20 illustrates the operation of the contactless power transfer system of the variation example shown in FIG. 19.

Referring to FIG. 20, the vehicle 100 is equipped with the power receiving unit 110 including the circular-type or polarized-type coil unit.

The power transmitting device includes a power transmitting unit 220AB of a changeable configuration. The configuration of the power transmitting unit 220AB can be alternately changed by a switching signal to the configuration corresponding to a circular-type coil unit and the configuration corresponding to a polarized-type coil unit.

The vehicle 100 sends to the communication unit 230 of the power transmitting device a message M5 including information about whether the type of the coil unit installed at the host vehicle is the circular type, the longitudinally-oriented polarized type or the laterally-oriented polarized type. The information that indicates each of coil types, that is, the circular type, the longitudinally-oriented polarized type and the laterally-oriented polarized type, is an example of information indicating a magnetic flux passage characteristic. The information to be sent may be represented in another format, provided that it indicates the magnetic flux passage characteristic.

The power transmitting device 200 changes the configuration of the power transmitting unit 220AB such as to obtain the configuration corresponding to the power receiving unit of the vehicle on the basis of information received by the communication unit 230.

Even when the coils of the power receiving units installed on the vehicles are of a plurality of types, the power transfer system shown in FIG. 20 can be also adapted for vehicles of various types, in the same manner as the power transfer system shown in FIG. 19.

Figure 21:
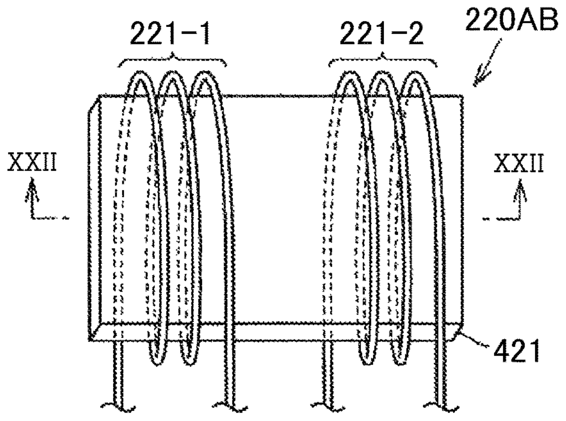
FIG. 21 shows a configuration example of the power transmitting unit 220AB shown in FIG. 20.

FIG. 21 shows a configuration example of the power transmitting unit 220AB shown in FIG. 20. The power transmitting unit 220AB includes a plate-shaped magnetic material 421 and coils 221-1 and 221-2 wound on the magnetic material 421. The coils 221-1 and 221-2 are wound such as to be separated by the center portion of the magnetic material 421.

Figure 22:
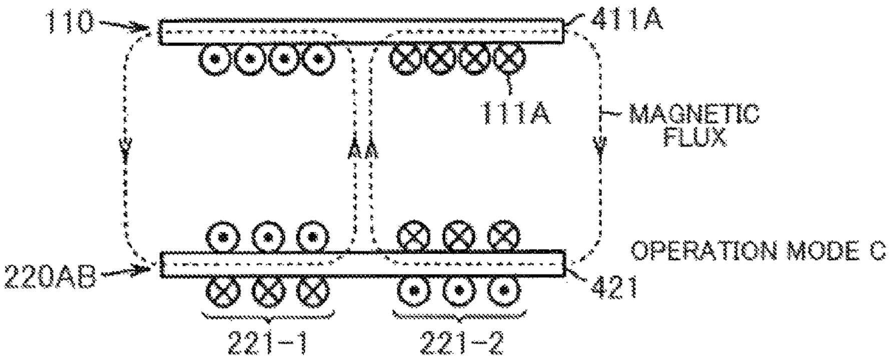
FIG. 22 is a cross-sectional view taken along the XXII-XXII line in FIG. 21 in the case of operation in an operation mode C.

FIG. 22 is a cross-sectional view taken along the XXII-XXII line in FIG. 21 in the case of operation in an operation mode C. The operation mode C is a mode in which the power transmitting unit 220AB operates such as to obtain a magnetic flux distribution corresponding to that of the circular-type coil unit. In FIG. 22, the power transmitting unit 220AB and the power receiving unit 110 including the circular-type power receiving unit 111A are disposed opposite each other.

In the power transmitting unit 220AB operating in the operation mode C, electric currents flow in different directions in the coil 221-1 and the coil 221-2. In the operation mode C, the magnetic flux passes from a portion (referred to hereinbelow as center portion) between the coil 221-1 and the coil 221-2 toward the power receiving coil. The magnetic flux that has passed from the center portion of the power transmitting unit 220AB to the center portion of the power receiving coil 111A passes through the inside of the magnetic material 411A toward the outside, returns around the outer side of the coil winding, passes through the inside of the magnetic material 421 toward the center, and returns to the center portion of the power transmitting unit 220AB. Since an AC current flows in the power transmitting unit 220AB, where the orientation of the current flowing in the coil is reversed, the orientation of the magnetic flux is also reversed.

Figure 23:
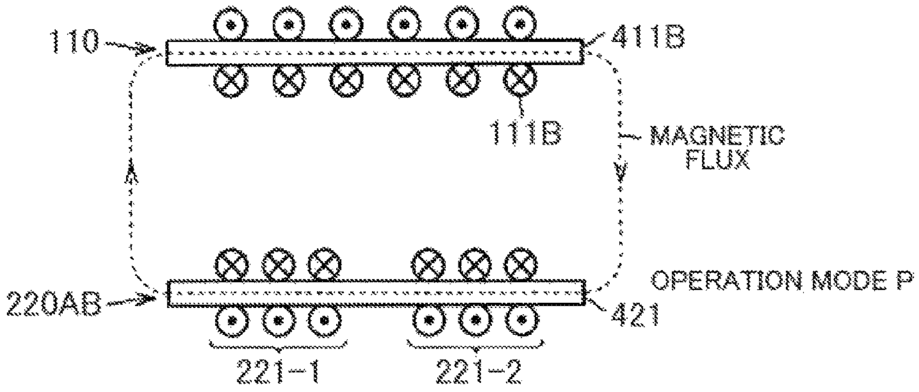
FIG. 23 is a cross-sectional view taken along the XXII-XXII line in FIG. 21 in the case of operation in an operation mode P.

FIG. 23 is a cross-sectional view taken along the XXII-XXII line in FIG. 21 in the case of operation in an operation mode P. The operation mode P is a mode in which the power transmitting unit 220AB operates such as to obtain a magnetic flux distribution corresponding to that of the polarized-type coil unit. In FIG. 23, the power transmitting unit 220AB and the power receiving unit 110 including the polarized-type power receiving unit 111B are disposed opposite each other.

In the power transmitting unit 220AB operating in the operation mode P, the magnetic flux passes from the end portion of the magnetic material 421 on the coil 221-2 side toward the end portion of the magnetic material 421 on the coil 221-1 side. The magnetic flux that has passed through the inside of the magnetic material 421 from the coil 221-2 toward the coil 221-1 passes toward one end of the power receiving coil 111B, then passes through the inside of the magnetic material 411B from the one end to the other end of the power receiving coil 111B, and returns to the end portion of the coil 221-2 on the magnetic material 421 side. Since an AC current flows in the power transmitting unit 220AB, where the orientation of the current flowing in the coil is reversed, the orientation of the magnetic flux is also reversed.

Figure 24:
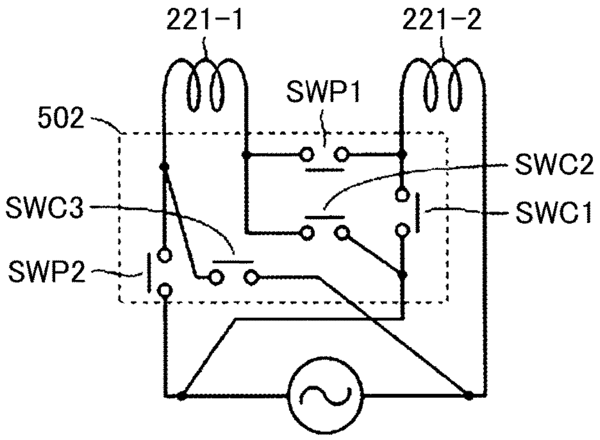
FIG. 24 is a circuit diagram showing the first configuration example of switching the connection of a coil 221-1 and a coil 221-2.

FIG. 24 is a circuit diagram showing the first configuration example of switching the connection of the coil 221-1 and the coil 221-2.

Referring to FIG. 24, a switching unit 502 includes relays SWC1 to SWC3 and relays SWP1 and SWP2. Where operation is performed in the operation mode C, the relays SWC1 to SWC3 are controlled to be in the energized state, and the relays SWP1 and SWP2 are controlled to be in the non-energized state. In the operation mode C, electric currents in the coil 221-1 and the coil 221-2 flow in the directions that differ in the cross-sectional view, as shown in FIG. 22.

Where operation is performed in the operation mode P, the relays SWC1 to SWC3 are controlled to be in the non-energized state, and the relays SWP1 and SWP2 are controlled to be in the energized state. In the operation mode P, electric currents in the coil 221-1 and the coil 221-2 flow in the directions that differ in the cross-sectional view, as shown in FIG. 23.

Figure 25:
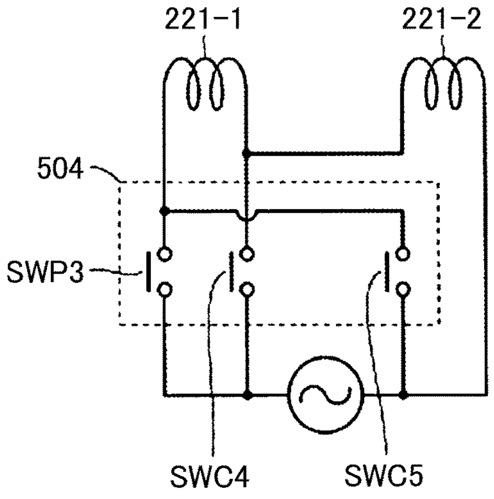
FIG. 25 is a circuit diagram showing the second configuration example of switching the connection of the coil 221-1 and the coil 221-2.

FIG. 25 is a circuit diagram showing the second configuration example of switching the connection of the coil 221-1 and the coil 221-2.

Referring to FIG. 25, a switching unit 504 includes relays SWC4 and SWC5 and a relay SWP3. Where operation is performed in the operation mode C, the relays SWC4 and SWC5 are controlled to be in the energized state, and the relay SWP3 is controlled to be in the non-energized state. In the operation mode C, electric currents in the coil 221-1 and the coil 221-2 flow in the directions that differ in the cross-sectional view, as shown in FIG. 22.

Where operation is performed in the operation mode P, the relays SWC4 and SWC5 are controlled to be in the non-energized state, and the relay SWP3 is controlled to be in the energized state. In the operation mode P, electric currents in the coil 221-1 and the coil 221-2 flow in the directions that differ in the cross-sectional view, as shown in FIG. 23.

Figure 26:
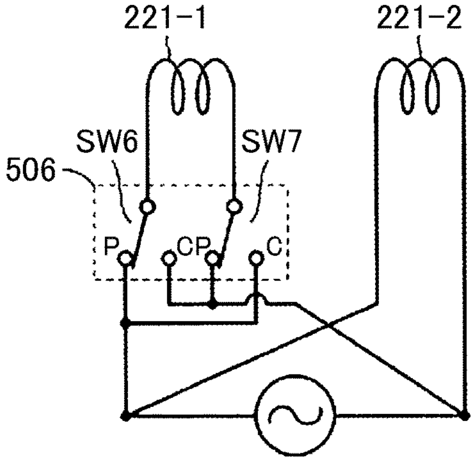
FIG. 26 is a circuit diagram showing the third configuration example of switching the connection of the coil 221-1 and the coil 221-2.

FIG. 26 is a circuit diagram showing the third configuration example of switching the connection of the coil 221-1 and the coil 221-2.

Referring to FIG. 26, a switching unit 506 includes switches SW6 and SW7. Where operation is performed in the operation mode C, switches SW6 and SW7 are each controlled to select a C terminal. In the operation mode C, electric currents in the coil 221-1 and the coil 221-2 flow in the directions that differ in the cross-sectional view, as shown in FIG. 22.

Where operation is performed in the operation mode P, switches SW6 and SW7 are each controlled to select a P terminal. In the operation mode P, electric currents in the coil 221-1 and the coil 221-2 flow in the directions that differ in the cross-sectional view, as shown in FIG. 23.

Figure 27:
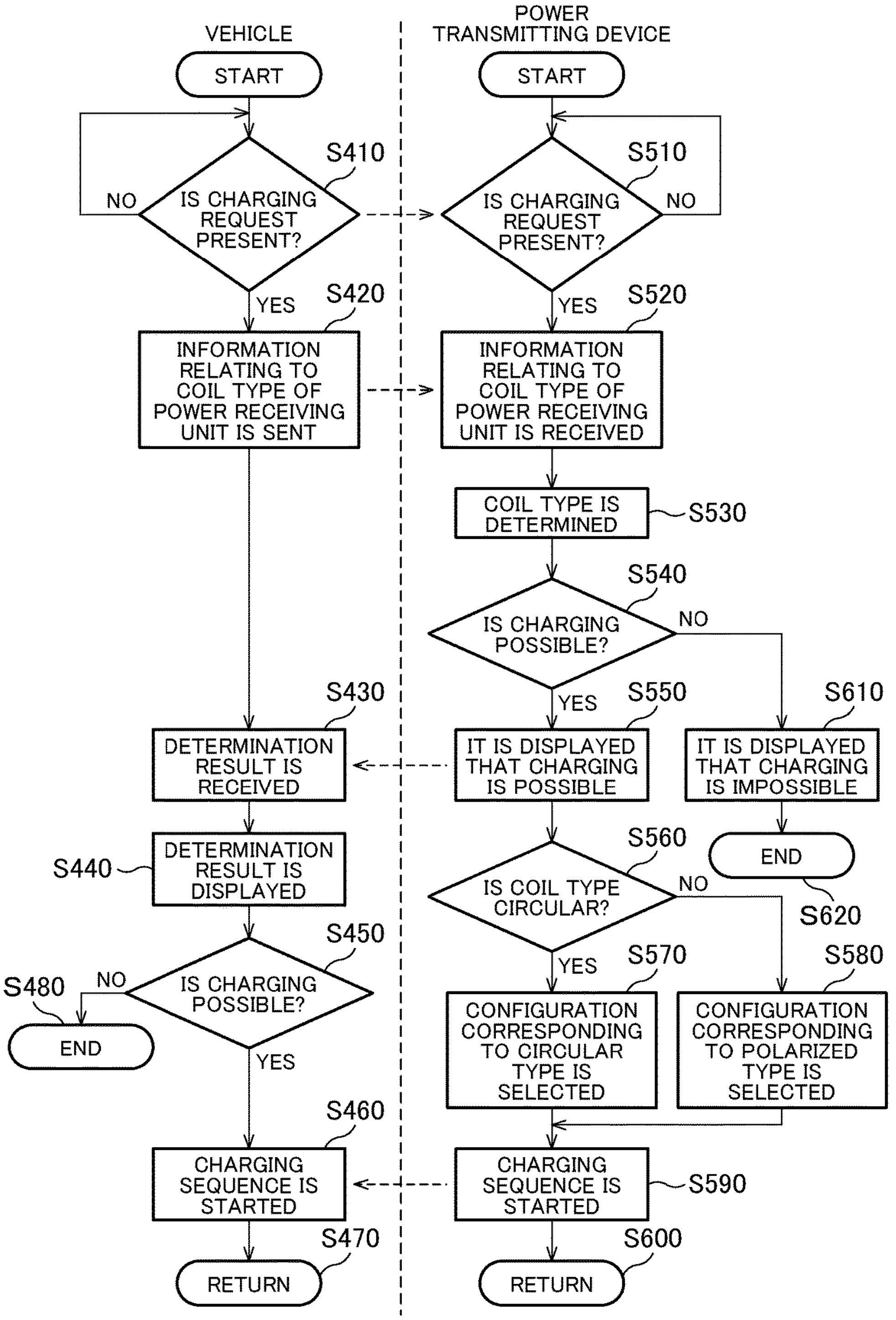
FIG. 27 is a flowchart illustrating control executed in the vehicle and power transmitting device in Embodiment 2.

FIG. 27 is a flowchart illustrating control executed in the vehicle and power transmitting device in Embodiment 2.

Referring to FIGS. 7 and 27, in the vehicle 100, in step S410, the vehicle ECU 300 monitors whether there is a charging request. When the input of the charging start signal TRG by the user's operation is detected, the vehicle ECU 300 sends information to the effect that there is a charging request to the power transmitting device 200 via the communication unit 160. The processing then advances from step S410 to step S420.

Meanwhile, in the power transmitting device 200, in step S510, the power transmission ECU 240 monitors whether there is a charging request. Where information to the effect that there is a charging request is sent from the communication unit 160 of the vehicle 100, and the power transmission ECU 240 detects the charging request via the communication unit 230, the processing advances from step S510 to step S520.

In the vehicle 100, in step S420, information relating to the coil type of the power receiving unit 110 is sent by the communication unit 160 toward the power transmitting device 200. In the power transmitting device 200, in step S520, the information relating to the coil type of the power receiving unit 110 is received by the communication unit 230, and the coil type of the power transmitting unit 220 is determined in step S530. The information relating to the coil type, for example, includes information about whether the coil is of the circular type, the polarized type, the longitudinally-oriented polarized type, or the laterally-oriented polarized type.

In step S540, the power transmission ECU 240 determines, on the basis of information relating to the coil type of the power receiving unit 110 that is received in step S520, whether the coil type of the power receiving unit 110 is compatible with the coil type that can be configured by the power transmitting unit 220. Where the coil types are compatible, it is determined that charging is possible, and where the coil types are incompatible, it is determined that charging is impossible.

Where the coil types are determined in step S540 to be incompatible, the processing advances to step S610, and the power transmission ECU 240 confirms the determination that charging is impossible, causes the display unit 242 to display that charging is impossible, and sends the determination result to the vehicle 100. Then, the processing on the power transmitting device 200 side is ended in step S620.

Meanwhile, where the coil types are determined in step S540 to be compatible, that is, when the power transmitting coil that can be adapted for the coil type of the vehicle can be selected, the processing advances to step S550, and the power transmission ECU 240 confirms the determination that charging is possible, causes the display unit 242 to display the determination result, and sends the determination result to the vehicle 100.

In the vehicle 100, the determination result is received by the communication unit 160 in step S430, and the vehicle ECU 300 causes the display unit 142, such as a liquid crystal display, to display the determination result in step S440. The determination result may be provided to the driver by voice instead of displaying on the display unit 142.

In the power transmitting device 200, after the possibility of charging has been displayed in step S550, it is determined in step S560 whether the coil type of the vehicle 100 is a circular type. Where it is determined in step S550 that the coil type is the circular type, the processing advances to step S570, and the power transmission ECU 240 selects the configuration corresponding to the circular type as the coil type of the power transmitting unit 220. This selection may be performed by using one of a plurality of power transmitting units, as shown in FIG. 19, and not using other power transmitting units, or by setting the configuration corresponding to the circular type by switching the connection of coil units as shown in FIGS. 20 to 26.

Where it is determined in step S560 that the coil type is not a circular type, the processing advances to step S580 and the power transmission ECU 240 selects the configuration corresponding to the polarized type as the coil type of the power transmitting unit 220. This selection may be performed by using one of a plurality of power transmitting units, as shown in FIG. 19, and not using other power transmitting units, or by setting the configuration corresponding to the polarized type by switching the connection of coil units as shown in FIGS. 20 to 26. On route from step S560 to step S580, it is also possible to determine further whether the coil type is a longitudinally-oriented polarized coil type or a laterally-oriented polarized coil type and select the corresponding configuration.

After the coil configuration has been selected in step S570 or step S580, the power transmission ECU 240 starts the charging sequence of the vehicle in step S590, and the processing advances to the routine of charging processing in step S600.

On the vehicle side, in step S450, it is determined whether or not charging is possible on the basis of the charging possibility determination result from the power transmitting device. Where charging is determined to be impossible in step S450, the processing advances to step S480, and the charging processing on the vehicle side is ended.

Where charging is determined to be possible in step S450, the processing advances to step S460. Communication instructing to start the charging is also performed to the vehicle side as the charging sequence in step S590 is started, and the charging sequence is started in step S460 also on the vehicle side. Then, in step S470, the processing advances to the routine of charging processing.

Figure 28:
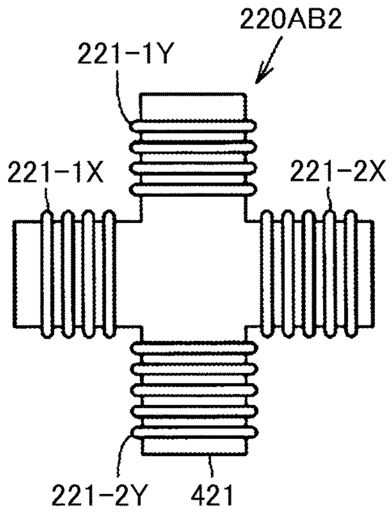
FIG. 28 shows another variation example of the coil shown in FIG. 21.

FIG. 28 shows another variation example of the coil shown in FIG. 21.

Referring to FIG. 28, a power transmitting unit 220AB2 includes a cross-shaped magnetic material 421 and four coils 221-1X, 221-2X, 221-1Y, and 221-2Y wound separately on the magnetic material 421.

Where the corresponding power receiving unit is of a laterally-oriented polarized type, the coil 221-1X and the coil 221-2X are selected and used. In this case, the unselected coils 221-1Y and 221-2Y are not used. The connection is determined such that the electric currents flow in the same direction in the coil 221-1X and the coil 221-2X, in the same manner as in the case illustrated by FIG. 23.

Where the corresponding power receiving unit is of a longitudinally-oriented polarized type, the coil 221-1Y and the coil 221-2Y are selected and used. In this case, the unselected coils 221-1X and 221-2X are not used. The connection is determined such that the electric currents flow in the same direction in the coil 221-1Y and the coil 221-2Y, in the same manner as in the case illustrated by FIG. 23.

Meanwhile, where the corresponding power receiving unit is of a circular type, the coil 221-1X and the coil 221-2X are selected and used. In this case, the coils 221-1Y and 221-2Y are not used. The connection is determined such that the electric currents flow in different directions in the coil 221-1X and the coil 221-2X, in the same manner as in the case illustrated by FIG. 22.

Instead of selecting the coil 221-1X and the coil 221-2X, it is also possible to select the coils 221-1Y and 221-2Y and determine the connection such that the electric currents flow in different directions in the coil 221-1Y and the coil 221-2Y. Further, the pair of the coil 221-1X and the coil 221-2X and the pair of coils 221-1Y and 221-2Y may be used simultaneously and the electric currents may be made to flow such that the magnetic flux is released from the cross-shaped center portion.

Figure 29:
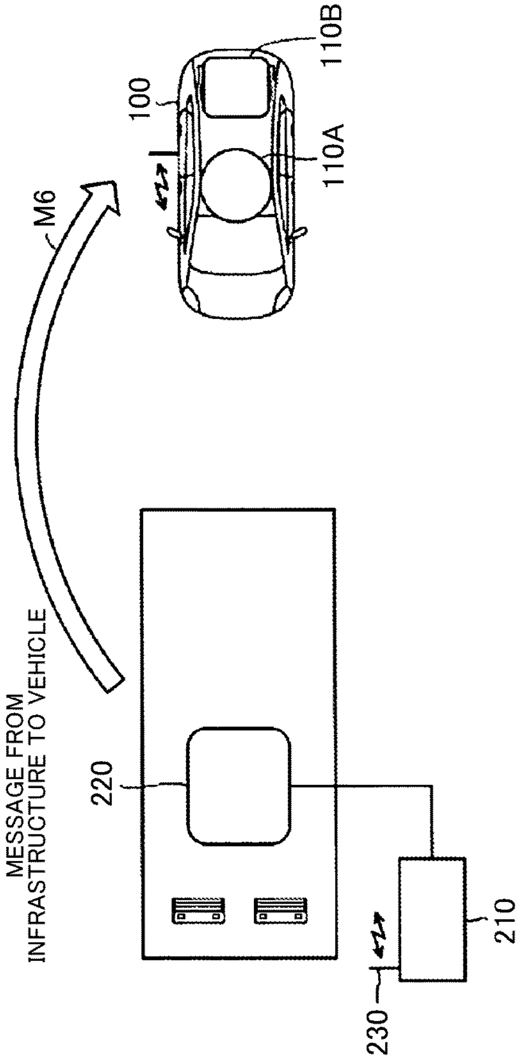
FIG. 29 illustrates the operation of the contactless power transfer system of a variation example of Embodiment 2.

FIG. 29 illustrates the operation of the contactless power transfer system of a variation example of Embodiment 2.

Referring to FIG. 29, the power transmitting device is equipped with the power transmitting unit 220 including a circular-type or polarized type coil unit.

The vehicle 100 includes a power receiving unit 110A and a power receiving unit 110B. The power receiving unit 110A includes a circular-type coil unit. The power receiving unit 110B includes a polarized-type coil unit.

The power transmitting device sends a message M6 including information about whether the type of the coil unit of the power transmitting device is the circular type, the longitudinally-oriented polarized type or the laterally-oriented polarized type from the communication unit 230 to the vehicle 100. The information that indicates each of coil types, that is, the circular type, the longitudinally-oriented polarized type and the laterally-oriented polarized type, is an example of information indicating a magnetic flux passage characteristic. The information to be sent may be represented in another format, provided that it indicates the magnetic flux passage characteristic.

The vehicle selects and uses a power receiving unit corresponding to the power transiting unit of the power transmitting device on the basis of information received from the communication unit 230.

Even when the coils of power transmitting units of power transmitting devices are of a plurality of types, the power transfer system of the variation example of Embodiment 2 can be adapted for power transmitting devices of various types.

Figure 30:
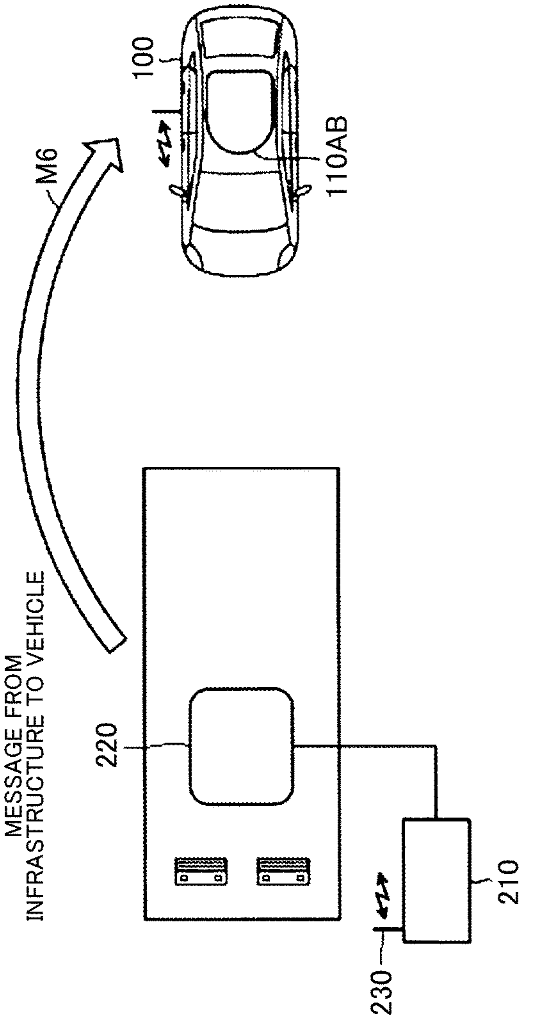
FIG. 30 illustrates the operation of a variation example of the contactless power transfer system shown in FIG. 29.

FIG. 30 illustrates the operation of the contactless power transfer system of the variation example shown in FIG. 29.

Referring to FIG. 30, the power transmitting device is equipped with the power transmitting unit 220 including a circular-type or polarized-type coil unit.

The vehicle 100 includes a power receiving unit 110AB of a changeable configuration. The configuration of the power receiving unit 110AB can be alternately changed by a switching signal to the configuration corresponding to a circular-type coil unit and the configuration corresponding to a polarized-type coil unit.

The configuration similar to that of the power transmitting unit shown in FIGS. 24, 25, 26, and 28 can be used as the configuration of such switchable power receiving unit 110AB.

The power transmitting device sends the message M6 including information about whether the type of the coil unit of the power transmitting device is the circular type, the longitudinally-oriented polarized type or the laterally-oriented polarized type from the communication unit 230 to the vehicle 100. The information that indicates each of coil types, that is, the circular type, the longitudinally-oriented polarized type and the laterally-oriented polarized type, is an example of information indicating a magnetic flux passage characteristic. The information to be sent may be represented in another format, provided that it indicates the magnetic flux passage characteristic.

The vehicle changes the configuration of the power receiving unit 110AB to the configuration corresponding to the power transmitting unit of the power transmitting device on the basis of information received from the communication unit 230.

Even when the coils of power transmitting units arranged in power transmitting devices are of a plurality of types, the power transfer system shown in FIG. 30 can be adapted for power transmitting devices of various types, in the same manner as with the configuration shown in FIG. 29.

Figure 31:
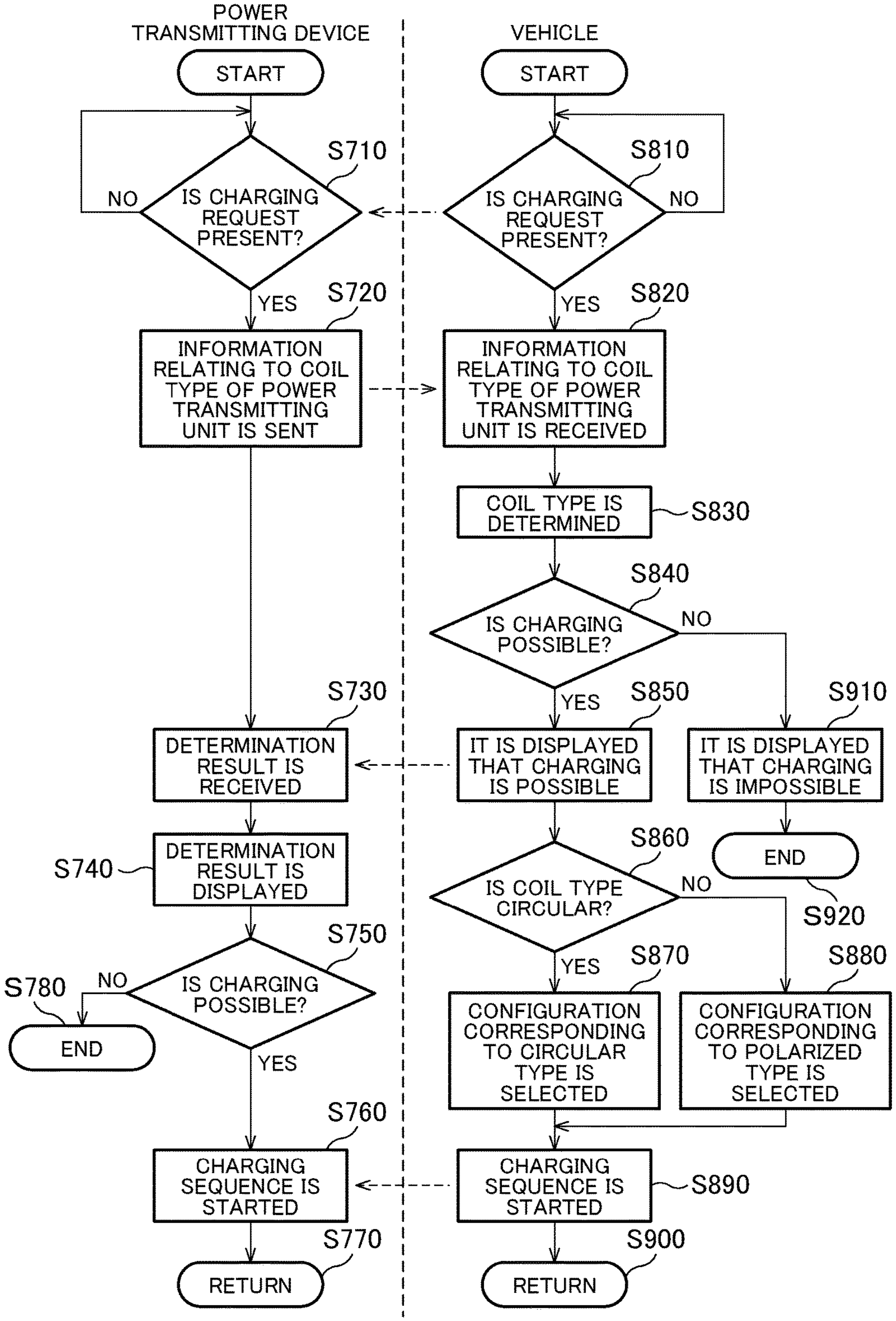
FIG. 31 is a flowchart for explaining the control executed at the vehicle and power transmitting device in a variation example of Embodiment 2.

FIG. 31 is a flowchart for explaining the control executed at the vehicle and power transmitting device in a variation example of Embodiment 2.

Referring to FIGS. 7 and 31, in the vehicle 100, the presence/absence of a charging request is monitored by the vehicle ECU 300 in step S810. Where the input of a charging start signal TRG by the user's operation is detected, the vehicle ECU 300 sends information to the effect that the charging request is present to the power transmitting device 200 via the communication unit 160. The processing then advances from step S810 to step S820.

Meanwhile, in the power transmitting device 200, the presence/absence of a charging request is monitored by the power transmission ECU 240 in step S710. Where information to the effect that the charging request is present is sent from the communication unit 160 of the vehicle 100 and the power transmission ECU 240 detects the charging request via the communication unit 230, the processing advances from step S710 to step S720.

In the power transmitting device 200, in step S720, information relating to the coil type of the power transmitting unit 220 is sent by the communication unit 230 toward the vehicle 100. In the vehicle 100, in step S820, information relating to the coil type of the power transmitting unit 220 is received by the communication unit 160, and the coil type of the power transmitting unit 220 is determined in step S830. The information relating to the coil type, for example, includes information about whether the coil is of the circular type, the polarized type, the longitudinally-oriented polarized type, or the laterally-oriented polarized type.

Further, in step S840, the vehicle ECU 300 determines, on the basis of information relating to the coil type of the power transmitting unit that is received in step S820, whether the coil type of the power transmitting unit is compatible with the coil type that can be configured by the power receiving unit. Where the coil types are compatible, it is determined that charging is possible, and where the coil types are incompatible, it is determined that charging is impossible.

Where the coil types are determined in step S840 to be incompatible, the processing advances to step S910, and the vehicle ECU 300 confirms the determination that charging is impossible, causes the display unit 142 to display that charging is impossible, and sends the determination result to the power transmitting device 200. Then, the processing on the vehicle side is ended in step S920.

Meanwhile, where the coil types are determined in step S840 to be compatible, that is, when the power receiving coil that can be adapted for the coil type of the power transmitting device can be selected, the processing advances to step S850, and the vehicle ECU 300 confirms the determination that charging is possible, causes the display unit 142 to display the determination result, and sends the determination result to the power transmitting device 200.

In the power transmitting device 200, the determination result is received by the communication unit 230 in step S730, and the power transmission ECU 240 causes the display unit 242, such as a liquid crystal display, to display the determination result in step S740. The determination result may be provided to the driver by voice instead of displaying on the display unit 242.

In the vehicle 100, after the possibility of charging has been displayed in step S850, it is determined in step S860 whether the coil type of the power transmitting device 200 is a circular type. Where it is determined in step S850 that the coil type is the circular type, the processing advances to step S870, and the vehicle ECU 300 selects the configuration that can correspond to the circular type as the coil type of the power receiving unit 110. This selection may be performed by using one of a plurality of power receiving units 110A and 110B, as shown in FIG. 29, and not using other power transmitting units, or by setting the configuration corresponding to the circular type by switching the connection of coil units inside the power receiving unit 110AB as shown in FIG. 30.

Where it is determined in step S860 that the coil type is not a circular type, the processing advances to step S880 and the vehicle ECU 300 selects the configuration that can correspond to the polarized type as the coil type of the power receiving unit 110. This selection may be performed by using one of a plurality of power receiving units 110A and 110B, as shown in FIG. 29, and not using other power transmitting units, or by setting the configuration corresponding to the polarized type by switching the connection of coil units inside the power receiving unit 110AB as shown in FIG. 30. On route from step S860 to step S880, it is also possible to determine further whether the coil type is a longitudinally-oriented polarized coil type or a laterally-oriented polarized coil type and select the corresponding configuration.

After the coil configuration has been selected in step S870 or step S880, the vehicle ECU 300 starts the charging sequence of the vehicle in step S890, and the processing advances to the routine of charging processing in step S900.

In the power transmitting device 200, in step 750, it is determined whether or not charging is possible on the basis of the charging possibility determination result from the vehicle. Where charging is determined to be impossible in step S750, the processing advances to step S780, and the charging processing in the power transmitting device 200 is ended.

Where charging is determined to be possible in step S750, the processing advances to step S760. Communication instructing to start the charging is performed from the vehicle to the power transmitting device as the charging sequence in step S890 is started, and the charging sequence is started in step S760 also on the power transmitting device side. Then, in step S770, the processing advances to the routine of charging processing.

Finally, Embodiments 1 and 2 and also the variation examples thereof will be summarized by referring again to the appended drawings. The contactless power transmitting device shown in FIGS. 7, 8, and 18 is a contactless power transmitting device capable of contactlessly transmitting power to a power receiving device (vehicle 100), the contactless power transmitting device including: the power transmitting unit 220 configured to be capable of contactlessly transmitting power to the power receiving device; and the communication unit 230 that sends information, which relates to a magnetic flux distribution of the power transmitting unit during power transmission, to the power receiving device.

It is preferred that the information be used to determine whether or not the power receiving device (vehicle 100) is to receive electric power from the contactless power transmitting device (power transmitting device 200), as shown in FIG. 18.

It is more preferred that the communication unit 230 send the information before the power transmitting unit 220 starts transmitting power to the power receiving device vehicle 100), as shown in FIG. 18.

It is preferred that the information include information relating to a structure of a part constituting the power transmitting unit or a parameter of the power transmitting unit that affects a magnetic flux distribution occurring in the power transmitting unit 220 during power transmission. The structure of a part includes the coil type, for example, the circular type, the polarized type, the longitudinally-oriented polarized type, and the laterally-oriented polarized type. The structure of a part also includes information on the core shape, wiring direction, and winding direction. The information relating to the parameter of the power transmitting unit includes, for example, a parameter indicating the magnetic flux distribution occurring in the power transmitting unit.

The power transmitting device 200 shown in FIGS. 7, 8, and 19 to 28 is a power transmitting device capable of contactlessly transmitting power to a power receiving device (vehicle 100), the power transmitting device including: the power transmitting unit 220AB configured to be capable of contactlessly transmitting power to the power receiving device (vehicle 100); and the adjustment device (switching units 502 to 506) capable of adjusting a magnetic flux distribution of the power transmitting unit 220 during power transmission.

It is preferred that the power transmitting device 200 further include, as explained with reference to FIG. 27, a control unit (power transmission ECU 240) that controls the adjustment device on the basis of information relating to the power receiving device, such that the magnetic flux distribution of the power transmitting unit 220 during power transmission becomes compatible with the power receiving device (vehicle 100).

The power receiving device (vehicle 100) shown in FIGS. 8 and 16 is a contactless power receiving device capable of contactlessly receiving power from the power transmitting device 200, the power receiving device including: the power receiving unit 110 configured to be capable of contactlessly receiving power from the power transmitting device 200; and the communication unit 160 that sends information, which relates to a magnetic flux distribution of the power receiving unit during power reception, to the power transmitting device.

It is preferred that the information be used to determine whether or not the power transmitting device 200 is to transmit power to the contactless power receiving device (vehicle 100).

It is more preferred that the communication unit 160 send the information before the power receiving unit 110 starts receiving electric power from the power transmitting device 200, as shown in FIG. 16.

It is preferred that the information include information relating to a structure of a part constituting the power receiving unit 110 or a parameter of the power receiving unit that affects a magnetic flux distribution that should occur in the power receiving unit during power reception. The structure of a part includes the coil type, for example, the circular type, the polarized type, the longitudinally-oriented polarized type, and the laterally-oriented polarized type. The information relating to the parameter of the power receiving unit includes, for example, a parameter indicating the magnetic flux distribution that is assumed to occur when the power receiving unit is charged.

The power receiving device (vehicle 100) shown in FIGS. 7, 8, 24 to 26, and 31 is a contactless power receiving device capable of contactlessly receiving power from the power transmitting device 200, the contactless power receiving device including: the power receiving unit 110AB configured to be capable of contactlessly receiving power from the power transmitting device 200; and the adjustment device (switching units 502 to 506) capable of adjusting a magnetic flux distribution suitable for the power receiving unit during power reception.

It is preferred that the contactless power receiving device (vehicle 100) further include a control unit (vehicle ECU 300) that controls the adjustment device on the basis of information relating to the power transmitting device 200, such that the magnetic flux distribution suitable for the power receiving unit 110AB during power reception becomes compatible with the power transmitting device 200, as explained with reference to FIG. 31.

The contactless power transfer system shown in FIGS. 7, 8, and 18 includes the power receiving device (vehicle 100); and the power transmitting device 200 capable of contactlessly transmitting power to the power receiving device. The power transmitting device 200 includes the power transmitting unit 220 configured to be capable of contactlessly transmitting power to the power receiving device (vehicle 100); and the communication unit 230 that sends information, which relates to a magnetic flux distribution of the power transmitting unit during power transmission, to the power receiving device.

The contactless power transfer system shown in FIGS. 7, 8, and 16 includes the power transmitting device 200; and the power receiving device (vehicle 100) capable of contactlessly receiving power from the power transmitting device 200. The power receiving device (vehicle 100) includes the power receiving unit 110 configured to be capable of contactlessly receiving power from the power transmitting device 200; and the communication unit 160 that sends information, which relates to a magnetic flux distribution of the power receiving unit during power reception, to the power transmitting device 200.

APPLICATION EXAMPLES

As described hereinabove, according to the embodiment the coil type of the unit for which the power transmitting device can be adapted can be determined by communication between the vehicle and the power transmitting device before the charging operation is started. Further, the vehicle can receive this information even without traveling to the charging location.

Therefore, the vehicle can also communicate with a plurality of power transmitting devices and the position of the power transmitting device that can be used with the host vehicle can be selectively or emphatically displayed on a navigation device. Similar display may be also performed by conducting communication with an information center where such information has been recorded.

The embodiments disclosed herein are illustrative in all of the aspects thereof and should be not considered as restrictive. The scope of the invention is defined by the claims, rather than by the description above, and is intended to include the equivalent meanings to the claims and all of the modifications within the scope of the claims.

10—power transfer system; 12—power supply; 89—power transmission system; 90, 220, 220A, 220AB, 220AB2, 220B, 220K—power transmitting units; 91, 110, 110A, 110AB, 110B, 110K—power receiving units; 92, 97, 113, 223—electromagnetic induction coils; 93—power transmitting section; 94, 99—resonant coils; 95, 98, 222—capacitors; 96—power receiving section; 100, 100A, 100B—vehicles; 111, 340—secondary self-resonant coil; 111A, 111B, 111BX, 111BY—power receiving coils; 112, 222—capacitors, 113, 350—secondary coils; 118—mechanical power generating device; 121, 221—self-resonant coils; 130—motor generator; 140—mechanical power transmission gear; 142, 242—display units; 150—drive wheels; 160, 230—communication units; 171—current sensor; 172—voltage sensor; 173—load resistor; 174, SWC1 to SWC5, SWP1 to SWP3—relays; 180—rectifier; 190—electrical storage device; 200—power transmitting device; 210—charging stand; 221—coil; 221A, 221B—power transmitting coils; 223, 320—primary coils; 240—power transmission ECU; 246—fee reception unit; 250—power supply unit; 260—matching unit; 300—vehicle ECU; 310—high-frequency power supply; 360—load; 411A, 411B, 421, 421A, 421B—magnetic materials; 502, 504, 506—switching units; PCU—power control unit; SW6, SW7—switches

The invention claimed is:

1. A contactless power transmitting device capable of contactlessly transmitting power to a power receiving device, the contactless power transmitting device comprising:

a power transmitting unit configured to contactlessly transmit power to the power receiving device; and a communication unit configured to send information of the power transmitting unit, before all power transmission, to the power receiving device for identifying a compatibility of the power transmitting unit and the power receiving device, wherein the information sent by the communication unit to the power receiving device includes a coil type of the power transmitting unit, and wherein a coil compatibility is determined based on the coil type before all power transmission.

2. The contactless power transmitting device according to claim 1, wherein the information is used to determine whether or not the power receiving device is to receive electric power from the contactless power transmitting device.

3. The contactless power transmitting device according to claim 2, wherein the communication unit is configured to send the information before the power transmitting unit starts transmitting power to the power receiving device.

4. The contactless power transmitting device according to claim 1, wherein the information includes at least one of information (i) and information (ii), which affects a magnetic flux distribution occurring in the power transmitting unit during power transmission:

(i) the information relating to a structure of a part constituting the power transmitting unit, and (ii) the information relating to a parameter of the power transmitting unit.

5. A contactless power transmitting device capable of contactlessly transmitting power to a power receiving device, the contactless power transmitting device comprising:

a power transmitting unit configured to contactlessly transmit power to the power receiving device;

a communication unit configured to send information of the power transmitting unit, before all power transmission, to the power receiving device for identifying a compatibility of the power transmitting unit and the power receiving device, wherein the information sent by the communication unit to the power receiving device includes a coil type of the power transmitting unit, and wherein a coil compatibility is determined based on the coil type before all power transmission; and an adjustment device configured to adjust a magnetic flux distribution of the power transmitting unit during power transmission.

6. The contactless power transmitting device according to claim 5, further comprising a control unit configured to control the adjustment device based on information relating to the power receiving device, such that a magnetic flux distribution of the power transmitting unit during power transmission becomes compatible with the power receiving device.

7. A contactless power receiving device capable of contactlessly receiving power from a power transmitting device, the contactless power receiving device comprising:

a power receiving unit configured to contactlessly receive power from the power transmitting device; and a communication unit configured to send information of the power receiving unit, before all power reception, to the power transmitting device for identifying a compatibility of the power transmitting device and the power receiving unit, wherein the information sent by the communication unit to the power transmitting device includes a coil type of the power receiving unit, and wherein a coil compatibility is determined based on the coil type before all power reception.

8. The contactless power receiving device according to claim 7, wherein the information is used to determine whether or not the power transmitting device is to transmit power to the contactless power receiving device.

9. The contactless power receiving device according to claim 8, wherein the communication unit is configured to send the information before the power receiving unit starts receiving electric power from the power transmitting device.

10. The contactless power receiving device according to claim 7, wherein the information includes at least one of information (i) and information (ii), which affects a magnetic flux distribution that is to occur in the power receiving unit during power transmission:

(i) the information relating to a structure of a part constituting the power receiving unit, and (ii) the information relating to a parameter of the power receiving unit.

11. A contactless power receiving device capable of contactlessly receiving power from a power transmitting device, the contactless power receiving device comprising:

a power receiving unit configured to contactlessly receive power from the power transmitting device;

a communication unit configured to send information of the power receiving unit, before all power reception, to the power transmitting device for identifying a compatibility of the power transmitting device and the power receiving unit, wherein the information sent by the communication unit to the power transmitting device includes a coil type of the power receiving unit, and wherein a coil compatibility is determined based on the coil type before all power reception; and an adjustment device configured to adjust a magnetic flux distribution suitable for the power receiving unit during power reception.

12. The contactless power receiving device according to claim 11, further comprising a control unit configured to control the adjustment device based on information relating to the power transmitting device, such that a magnetic flux distribution suitable for the power receiving unit during power reception becomes compatible with the power transmitting device.

13. A contactless power transfer system comprising:

a power receiving device; and a power transmitting device configured to contactlessly transmit power to the power receiving device, wherein the power transmitting device comprises:

a power transmitting unit configured to contactlessly transmit power to the power receiving device; and a communication unit configured to send information of the power transmitting unit, before all power transmission, to the power receiving device for identifying a compatibility of the power transmitting unit and the power receiving device, wherein the information sent by the communication unit to the power receiving device includes a coil type of the power transmitting unit, and wherein a coil compatibility is determined based on the coil type before all power transmission.

14. A contactless power transfer system comprising:

a power transmitting device; and a power receiving device configured to contactlessly receive power from the power transmitting device, wherein the power receiving device comprises:

a power receiving unit configured to contactlessly receive power from the power transmitting device; and a communication unit configured to send information of the power receiving unit, before all power reception, to the power transmitting device for identifying a compatibility of the power transmitting device and the power receiving unit, wherein the information sent by the communication unit to the power transmitting device includes a coil type the power receiving unit, and wherein a coil compatibility is determined based on the coil type before all power reception.

15. A method of contactlessly transmitting power to a power receiving device using a power transmitting unit, comprising:

monitoring whether a charging request has been made by the power receiving device; and sending information, using a communication unit, from the power transmitting unit to the power receiving device before all power transmission, the information including a coil type of the power transmitting unit; and based on the coil type, determining whether the power transmitting unit and the power receiving device are compatible before power transmission.

16. A method of contactlessly receiving power from a contactless power transmitting device to a power receiving device having a power receiving unit, comprising:

monitoring whether a charging request has been made by the contactless power transmitting device;

sending information, using a communication unit, from the power receiving unit to the contactless power transmitting device before all power transmission, the information including a coil type of the power receiving unit; and based on the coil type, determining whether the contactless power transmitting device and the power receiving unit are compatible before power transmission.

* * * * *